(12) United States Patent
Hargest et al.

(10) Patent No.: US 10,821,629 B2
(45) Date of Patent: Nov. 3, 2020

(54) $CO_2$-LADEN CONCRETE PRECAST PRODUCTS AND THE METHOD OF MAKING THE SAME

(71) Applicant: CARBOCLAVE CORP., Kitchener (CA)

(72) Inventors: Paul Wayne Hargest, Kitchener (CA); Zaid Al-Ghouleh, Montreal (CA)

(*) Notice: Subject to any disclaimer, the term of this patent is extended or adjusted under 35 U.S.C. 154(b) by 5 days.

(21) Appl. No.: 15/759,431

(22) PCT Filed: Sep. 12, 2016

(86) PCT No.: PCT/CA2016/051076
§ 371 (c)(1),
(2) Date: Mar. 12, 2018

(87) PCT Pub. No.: WO2017/041188
PCT Pub. Date: Mar. 16, 2017

(65) Prior Publication Data
US 2019/0047175 A1    Feb. 14, 2019

Related U.S. Application Data

(60) Provisional application No. 62/217,239, filed on Sep. 11, 2015.

(51) Int. Cl.
*C04B 38/00*   (2006.01)
*B28B 11/24*   (2006.01)
(Continued)

(52) U.S. Cl.
CPC .......... *B28B 11/245* (2013.01); *C04B 40/006* (2013.01); *C04B 40/0236* (2013.01)

(58) Field of Classification Search
USPC ........................................ 106/682, 672, 638
See application file for complete search history.

(56) References Cited

U.S. PATENT DOCUMENTS

| 4,436,498 A | 3/1984 | Murray |
| 5,690,729 A | 11/1997 | Jones, Jr. |

(Continued)

FOREIGN PATENT DOCUMENTS

| CN | 101125442 A | 2/2008 |
| CN | 101774790 | 7/2010 |

(Continued)

OTHER PUBLICATIONS

Young, J. F., Berger, R. L. and Breese, J. (1974), "Accelerated Curing of Compacted Calcium Silicate Mortars on Exposure to CO2". Journal of the American Ceramic Society, 57: 394-397.

(Continued)

*Primary Examiner* — James E McDonough
(74) *Attorney, Agent, or Firm* — Benoit & Cote Inc.; France Côté

(57) ABSTRACT

The present invention relates to a process for producing precast products in an airtight enclosure, which comprises the steps of a carbonation of pre-dried concrete precast units by feeding $CO_2$ gas into a closed airtight enclosure under near ambient atmospheric pressure (psig between 0 and 2) and/or low pressure (between 2 and 15 psig) conditions, wherein said pre-dried concrete units have lost between 25 to 60% of their initial mix water content.

16 Claims, 12 Drawing Sheets

(51) Int. Cl.
  *C04B 40/02* (2006.01)
  *C04B 40/00* (2006.01)
  *C04B 20/00* (2006.01)
  *C04B 16/08* (2006.01)
  *C04B 7/00* (2006.01)
  *C04B 7/34* (2006.01)
  *C04B 28/00* (2006.01)
  *C04B 32/00* (2006.01)

(56) References Cited

U.S. PATENT DOCUMENTS

| | | | |
|---|---|---|---|
| 5,935,317 A | 8/1999 | Soroushian et al. | |
| 6,454,632 B1 * | 9/2002 | Jones | C04B 41/5089 264/31 |
| 8,691,175 B2 * | 4/2014 | Kendall | C01F 11/182 106/463 |
| 2013/0256939 A1 * | 10/2013 | Devenney | C04B 28/10 264/115 |

FOREIGN PATENT DOCUMENTS

| | | | | |
|---|---|---|---|---|
| CN | -101774790 A | * | 7/2010 | C04B 28/02 |
| CN | 101774790 A | * | 7/2010 | C04B 28/02 |
| CN | 104290183 A | | 1/2015 | |
| EP | 0085910 | | 8/1983 | |
| WO | 8500587 A1 | | 2/1985 | |
| WO | 2015139121 A1 | | 9/2015 | |

OTHER PUBLICATIONS

J.M. Bukowski, R.L. Berger, "Reactivity and strength development of CO2 activated non-hydraulic calcium silicates", Cement and Concrete Research, vol. 9, Issue 1, 1979, pp. 57-68.
Puertas, F & Díaz, Irene & Barba, Antonio & Gazulla, Fernanda & Palacios, Marta & Gómez Tena, Maria Pilar & Martínez-Ramírez, Sagrario, "Ceramic wastes as alternative raw materials for Portland cement clinker production". Cement and Concrete Composites. 30. 2008, pp. 798-805.
Hilal El Hassan, Yixin Shao, Zaid Ghouleh, "Effect of Initial Curing on Carbonation of Lightweight Concrete Masonry Units" Journal ACI Materials, vol. 110, Issue 4, 2013, pp. 441-450.
Shao, Y, "Maximizing CO2 Uptake in Concrete Blocks Carbonation", AlchE, Nov. 8, 2013.
Daman, Panesar, "Properties of binary and ternary reactive MgO mortar blends subjected to CO2curring", Cement and Concrete Composites, Elsevier Applied Science Vo. 38, Mar. 28, 2013. pp. 40-49.
Shi, Caijun, "Effect of pre-conditioning on COcuring of lightweight concrete blocks mixtures", Construction and Building Materials, Elsevier, vol. 26, No. 1, Jun. 13, 2011. pp. 257-267.
Shao et al., "Maximizing CO2 Uptake in Concrete Blocks Carbonation" AlChE, AlChE Annual Meeting, Nov. 8, 2013.

* cited by examiner

Carbonated

Hydrated

Phenolphthalein pH indicator

Carbonation-modified surface
- Densification
- Lower permeability
- Encapsulating effect

CO2-LADEN CONCRETE PRECAST PRODUCTS AND THE METHOD OF MAKING THE SAME

CROSS-REFERENCE TO RELATED APPLICATIONS

This application claims priority of U.S. provisional application No. 62/217,239 filed on Sep. 11 2015 the specification of which is hereby incorporated by reference.

BACKGROUND

(a) Field

The subject matter disclosed generally relates to concrete precast units (referred thereto as Carboclave units) which are prepared by a unique process that chemically activates the binding of cement and cementitious materials by carbon dioxide through steps that involve pre-carbonation conditioning, self-cleaning carbonation impregnation, and post-carbonation hydration. The devised process can be applied to all precast concrete products (both reinforced and non-reinforced), including, but not limited to, masonry units, pavers, pipes, and hollow-core slabs. The process can similarly engage $CO_2$-reactive minerals, including various formulations of calcium-silicates (elite, belite, wollastonite, olivine, etc. . . . ), calcium-hydroxide, magnesium-silicates, and magnesium-hydroxide. Other non-conventional materials that can also be engaged by the presented process are magnesium-based binder systems, sulpho-aluminate-belite cements, steel-making slags, and waste incineration residues (fly-ash and bottom-ash).

(b) Related Prior Art

The carbonation process engages the calcium-silicate component of Portland cement, namely, tri-calcium-silicate ($3CaO.SiO_2^-$, $C_3S$-alite) and di-calcium-silicate ($2CaO.SiO_2$; $C_2S$-belite), which make up the majority of cement. The $CO_2$ gas reacts with these calcium-silicates, in the presence of water, to form C—S—H and $CaCO_3$ (according to Equations 1 and 2 below).

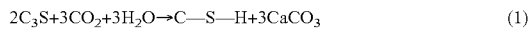  (1)

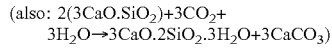

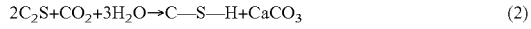  (2)

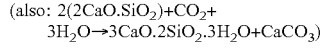

Generally, C—S—H is known as the phase that contributes to the binding of concrete, and is one of the products normally generated by the hydraulic reaction between cement and water (along with calcium-hydroxide at a much lower extent). The rate of formation of this phase is considerably accelerated in the presence of sufficient $CO_2$, which also acts as a reacting reagent that expedites the reaction which results in the precipitation of calcium-carbonate (instead of calcium-hydroxide). For this reason, carbonation is sometimes regarded as an accelerator for the hydration of cement. Early works by Young et al. [2] and Bukowski et al. [3] showed rapid consolidation of calcium-silicate powders subject to short periods of pure $CO_2$ exposure. This physical development is correlated to the equally rapid generation of C—S—H, as per Equations 1 and 2. The $CaCO_3$ crystals that are simultaneously produced from the reaction are found intimately intermingled with the C—S—H at the nanoscale. These nano-$CaCO_3$ precipitates reinforce the C—S—H matrix, resulting in a resilient composite binding matrix.

It would be highly desirable to realize an easily adaptable industrial process that practically exploits carbonation as a means to actively engage Portland cement within the timeframe of a conventional production cycle, thus arriving at a highly resilient concrete precast product characterized for having immediate high C—S—H content, considerably higher strength than commercial benchmarks, and the capacity to beneficially sequester carbon dioxide in the form of physically-reinforcing CaCO3 crystal precipitates.

SUMMARY

It is an embodiment of the present disclosure to provide a more sustainable process for producing concrete precast products (process herein coined "Carboclave technology") that can be adaptable to existing technically-sound curing systems, and/or retrofitted as an affordable curing extension. The process, which comprises the step of:

a) carbonation of pre-dried concrete precast units by feeding $CO_2$ gas into a closed air-tight chamber under near ambient atmospheric pressure (psig between 0 and 2) or low pressure (between 2 and 15 psig) conditions, wherein said pre-dried concrete block had lost between 25 to 50% its mix water content.

According to another embodiment, there is provided a concrete precast unit prepared by the process of the present invention; which has higher early-age strength and carbonate-reinforced C—S—H content and is more resistant to freeze-thaw damage, sulfate attack, shrinkage, efflorescence, and chemical ion permeation.

The prior drying of concrete blocks is important to ensure that an optimal water content is maintained, where enough is lost to create space that facilitates $CO_2$ diffusion, yet sufficient water is present for carbonation to take place.

Carboclave units can be manufactured from a blend of Portland cement and supplementary cementitious materials (SCM) to serve as concrete binder, which is activated by carbon dioxide for strength gain and improved durability. SCM loading ranges from 10% to 50% weight replacement of Portland cement. Carboclave units include both reinforced and non-reinforced precast concrete units.

Carboclave units exhibit higher early-age strength than commercial equivalents, and are more resistant to freeze-thaw damage, sulfate attack, shrinkage, efflorescence, and chemical ion permeation.

Carboclave units are processed by a unique methodology involving steps of pre-carbonation conditioning, self-cleaning carbonation impregnation, and post-carbonation hydration. The conceived carbonation curing is a pseudo-dynamic process with regimented CO2 multi-injections.

Carboclave units can use between 10-50% less cement depending on end-application specifications, thereby potentially cutting up to 70% (in the case of carbonation coupled with 50% cement replacement) the carbon footprint of standard commercial units, and saving energy by the elimination of steam, which is prevalently used by current-practice curing of concrete precast units. With regards to masonry blocks (or concrete masonry units—CMU), the high strength of Carboclave blocks allows for this offset of cement content, which is the most ecologically-taxing component of concrete. Replacing 25 to 50% of the cement content by cementitious fillers can be readily achieved by Carboclave blocks, with no compromise in meeting building specifications. This further lowers the overall carbon footprint, making these blocks the most sustainable among their product segment.

Carboclave units can potentially serve as carbon sinks for emission reduction, as $CO_2$ becomes permanently stored in these building materials. Far from simply serving as a storing medium, Carboclave blocks are stronger and more durable than equivalent commercial benchmarks. The $CO_2$ gas acts as an enhancing and expediting curing agent, resulting in very rapid consolidation and strength gain. It becomes perpetually embodied in concrete as property-enhancing nanoscale calcium-carbonate (CaCO3) crystals, which reinforce the hardened cement binding matrix. This lends the final concrete tangible improvements in strength and durability, outperforming similar products on the market and scoring higher on environmental attributes. Carboclave blocks are the preferred choice for site applications that specify highly-resilient, environmentally-sustainable precast articles (load-bearing and non-load-bearing).

In a Carboclave unit, the precipitation of CaCO3 crystals associates a densification effect, with the highest intensity confined to the very outer layer of the concrete. This effect brings about a decrease in porosity, where the size and volume of the pores, within the pore distribution of the hardened cement paste, are effectively reduced. In addition to enhancing durability and protecting from deleterious ingress, the dense outer layer also functions as a form of encapsulation to promote further internal hydration of the unreacted cement portion within the concrete. The very high compressive strength achieved by Carboclave blocks after 28 days is a reflection of this feature. Moreover, this internal hydration also incurs a pH rebound effect, bringing the pH back up to alkaline ranges typical of normal concrete and re-promoting the passivation protection of steel-reinforcement where applicable. This counters the pH drop associated with carbonation curing, which is known to be detrimental to steel components in reinforced concrete.

A 20-cm masonry Carboclave units can store more than 300 g of carbon dioxide, converting the gas into 680 g of solid, thermodynamically stable, performance-enhancing calcium-carbonate nano-crystals.

Carboclave-making technology can utilize existing curing systems, and can operate at near-ambient pressure, and at low pressure (<15 psig). concrete autoclave systems can be effortlessly refurbished for this purpose, thereby extending their lifetime by avoiding the harsh processing conditions typical of autoclave curing (i.e. high temperature and pressure). Carboclave technology can also be adapted to any seamless airtight chamber system that can withstand low internal pressures between 1 and 15 psig. Existing chambers that are not air-tight, can be made impermeable to gas by installing an internal or external sheathing material of geomembrane-grade polymer. Individual polymer sheets are carefully heat-welded to ensure no gas seepage in or out of the modified enclosure occurs. Another material that could be used to leak-proof chambers is polyurea coating.

In another embodiment of the near-ambient pressure carbonation, a relatively inexpensive curing chamber can be built to scale consisting of a steel structure with a polyurea sheath made via spraying, a al net-shape-forming method. In this embodiment of the carbonation curing process, a vacuuming pre-step is carried out to displace air within the chamber, before $CO_2$ gas is injected into the chamber. A vacuum of −50 to −90 kPa is targeted prior to the commencement of carbonation. To achieve this vacuum an electrical vacuum pump or a venturi-type pump can be used.

The $CO_2$ gas is then flowed into the enclosure until a pressure of slightly above ambient is achieved (between 0 and 2 psig). Regimented sequential injections of $CO_2$ then take place as per the methodologies of this invention. FIGS. 12 and 13 are schematic representations of this enclosure system. FIG. 12 presents an ambient system for paver blocks, where the polymer enclosure is structurally supported by a steel frame. A clamping system with a deformable gasket ensures that the opening contraption is well sealed. FIG. 13 is another embodiment of the curing enclosure, where the top dome latches onto a base plate, with a tight seal ensured by a full assembly screw mechanism (dome rotated clockwise until rubber gasket is severely compressed and a seal is ensured) or by a pressure-assisted clamping system (where internal positive pressure within the chamber pushes the peripheral flange of the dome against the beveled edge of the base plate).

Gas used in the Carboclave-making process is high-purity (>90% $CO_2$ concentration) by-product sourced $CO_2$ from the exhaust stream of emission intensive industrial operations. This ensures that carbon emissions are effectively diverted from the atmosphere. Low concentration flue-gas (between 8 and 15% $CO_2$ concentration) can also be used, however, this considerably lowers the rate and extent of the carbonation reaction.

Prior to carbonation, the charge concrete material to be carbonation cured needs to undergo a pre-setting drying step at standard room temperature and pressure. Careful monitoring of temperature and relative humidity is carried out to ensure target water loss is achieved by the concrete articles. Water loss allows for air voids to appear in the previously water-saturated pore structure, thereby promoting CO2 diffusion, and, hence, carbonation. Normally, a water loss between 25-50 weight % of the mix water is usually targeted. This is quantified by monitoring the weight lost by carefully selected representative concrete units using either a table-top balance or a suspended balance. This can be complemented by a non-destructive moisture reading, which once precisely calibrated one can seize physical weight measurements. If the drying rate is too slow due to a high relative humidity and/or low temperature, fans can be used to expedite drying.

The automation of the Carboclave-making process can be carried out by a Programmable Logic Controller (PLC) system equipped with an intuitive Human Machine Interface (HMI) panel. The control system monitors and displays the temperature, pressure, and $CO_2$ concentration at one or more locations within the interior of the curing enclosure/chamber. A flowmeter for the $CO_2$ gas stream will be required, with logging capability, to accurately quantify the total amount of $CO_2$ (by weight unit) injected into the chamber. The control system can control the gas inlet valves, outlet valves, and vacuum pump. The inlet valve can be configured such that air or $CO_2$ can be flowed into the chamber. For chamber assemblies that are not designed to withstand negative pressure, a vacuum pump cannot be used to displace the ambient air initially present in the chamber. In such a case, a purging step is carried out, where the heavier $CO_2$ gas is injected into the chamber until it displaces the lighter air. A regulator-type valve at the inlet will ensure that a desired pressure is maintained, where $CO_2$ is continuously replenished to match the rate of $CO_2$ consumed by the concrete charge. Once the total amount of $CO_2$ gas that can be fully absorbed by the concrete is injected, a dwell step is sufficiently prolonged until the pressure drops back to 0 psig. Air is used to flush the system at the end of the curing session, displacing any residual $CO_2$ in the chamber to the atmosphere or to the adjoined chamber connected in series. For chamber configurations with flexible polymer walls, a vacuum step precedes the sequential injections of $CO_2$. The controller will stop the vacuum pump once the desired vacuum is reached. FIG. 14 is a simple illustration of an HMI display of the control system for an autoclave assembly. The following is an example of an instrumentation package for the abovementioned control system.

1. Control Panel with DELTA HMI 15" 2 GB RAM, 32 GB SSD, Windows 7 with communication interface+ LABVIEW software with USB, RS232 and RS485 COMM Port
2. DELTA PLC with:
    8×Digital inputs to read signals from inlet and outlet flow switches
    5×Relays outputs to control valves, indications and free outputs for extra use
    Analog Inputs to read signals from:
        2×temperature sensor
        2×pressure sensor
        2×CO2 sensor
        2×free analog inputs for extra or future use (like humidity)
    2×Analog Outputs for furure and optional use
    1×RS232 communication port for HMI screen
    1×RS485 comm port, used to communicate with main panel and other PLC's
3. Switching Power Supply 90-240V AC input/24 VDC 2A Output
4. 5 Relays 10A Coil 24 VDC Finder with sockets
5. Panel Indicators, buttons, Line Filter and other required electrical miscellaneous
6. Panel screw Terminal blocks for sensors and in/out easy wiring and connections
7. 6×4 wires shielded cable 15m to connect sensors and control panel (KLASING GmbH)
8. 4×2 wires cable 20m to connect the inlet and outlet valves and the flow switches
9. 2×FESTO inlet/outlet valves with 24 VDC solenoid
10. 1×FESTO adjustable automatic relief valve for safety use
11. 1×Syxthense CDR CO2+temp Sensor Unit
12. 1×Omega Pressure Sensor 20 or 30 psi Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
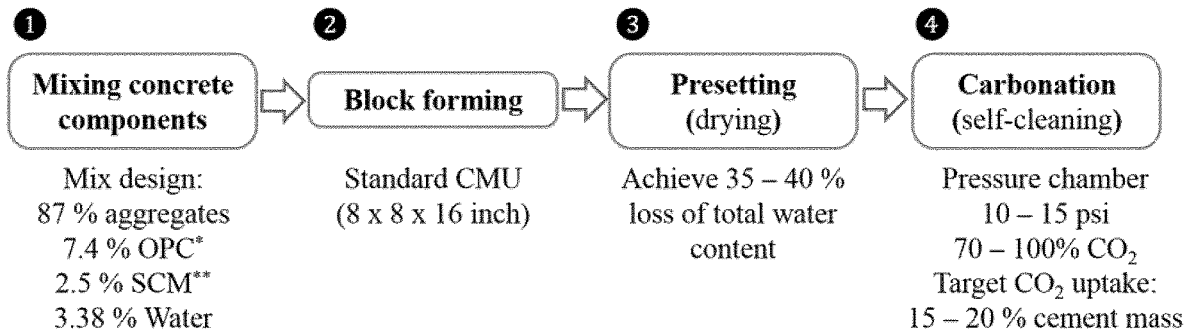
FIG. 1 illustrates the process flow diagram for Carboclave technology implemented for the making of concrete masonry blocks

The concrete units (referred herein as "Carboclave") are manufactured from a binder blend composed of Portland cement and a supplementary cementitious material (SCM) replacing between 0-50% cement content, and activated by carbon dioxide for consolidation strength and enhanced durability. Carboclave products present a more sustainable alternative to commercial precast benchmarks in that their production associates a lower carbon footprint, and additionally converts $CO_2$ gas into embedded, property-enhancing nanoscale calcium carbonate crystals ($CaCO_3$). The nano-$CaCO_3$ precipitates effectively reinforce the hardened cement paste, lending the final concrete product better mechanical performance and improved durability. Standardized test results show Carboclave concrete masonry units (CMU) as more resistant to common deleterious mechanisms (freeze/thaw cycling, sulfate attack, foreign ion ingress, etc. . . . ) in comparison to commercial blocks. Currently, standard CMU's are most commonly produced using steam-curing. Carboclave units on the other hand are produced through a carefully regimented carbonation process. The process entails a presetting (or drying) step prior to carbonation, whereby partial loss of mix water is achieved to facilitate $CO_2$ diffusion within the concrete. Carbonation is conducted in low pressure (<15 psi) conditions preferably in an airtight solid or flexible enclosure. It is prolonged until the calculated amount of CO2 gas fed into the chamber is entirely consumed by the blocks during processing. This feature ensures that minimum to no residual $CO_2$ gas is released to the atmosphere at the end of the processing cycle, an approach we coined "self-cleaning." One full production cycle (presetting and carbonation) would last between 24-30 hours.

The resulting Carboclave CMU's are characterized for being high in strength, with the capability of permanently storing an average of 0.3 kg (0.7 lb) of $CO_2$ gas per block. This is equivalent to embedding 680 g of nano-$CaCO_3$ crystals within the block, specifically within the resulting hardened paste (the binding matrix). The precipitation of these carbonates associates a densification effect that reduces porosity and pore-connectivity, thereby limiting ingress and the permeation of deleterious ions in and out of the concrete's structure. These blocks also displayed low water absorption, an important property for improved service-life performance.

The high strength achieved by the Carboclave concrete articles allows for reduction of cement content. This is an important environmental measure since cement is the most expensive and ecologically-taxing component of concrete. To this effect, Carboclave blocks have been demonstrated to replace 25% of the cement content with waste-derived SCM (secondary cementitious materials) like Lafarge® Newcem or Newcem-plus. The high-volume use of these additives is equivalent to diverting additional $CO_2$ from the atmosphere in terms of carbon footprint per block. This along with the physical fixation of $CO_2$ gas during processing, makes Carboclave blocks arguably the most sustainable and resilient CMU product in the market.

The proposed processing method applies to all precast concrete products (reinforced and non-reinforced) that employ Portland cement as binder, as well as other binder systems that comprise CO2-reactive minerals. It also works for all air-tight curing assemblies that can and cannot be withstand elevated pressures (between 2 and 15 psig). An near-ambient pressure (between 0 and 2 psig) curing system is also presented that either displaces ambient chamber atmosphere via a purging step (solid wall chambers) or a vacuum step (flexible polymer wall) prior to carbonation curing.

Market

Annually, approximately 4.3 billion CMUs are produced between Canada and the USA [1], with CMU's presenting only a small segment of precast products. Moreover, regulations for alleviating global carbon footprint will mandate companies in the near future to reduce and even capture their $CO_2$ emissions. In such case, there will be plenty of pure, industry-recovered $CO_2$ for utilization. The monetizing of $CO_2$ on a per ton basis is the ultimate aim of emerging carbon-trading/taxing green economies. Sequestration of $CO_2$ may therefore present a source of revenue in such a framework.

Carboclave Production Process

FIG. 1 illustrates the process flow diagram for the processing of the Carboclave blocks. Table 1 is an example of an adopted preferred mix design for CMU.

Mix Design (●):

An example of a preferred Carboclave mix design is summarized in Table 1. The proportions were devised for the block to be the most sustainable, with a 25% replacement of cement by SCM. Considering that the production of 1 ton of ordinary Portland cement (OPC) generates around 0.85 tons of $CO_2$ [4], a 25% replacement in a block translates to a $CO_2$ footprint reduction from 1.42 kg to 1.06 kg $CO_2$ per block.

TABLE 1

Mix proportions of Carboclave blocks
Carboclave (CMU) Mix Design

| Material | Mass (%) |
|---|---|
| Aggregates | 87.00 |
| Cement | 7.20-7.50 |
| SCM* | 2.50-2.80 |
| Water | 3.38 |
| water-to-cement (w/c) | 0.35 |

SCM: Supplementary Cementitious Material (Lafarge ® Newcem or Newcem-Plus)

Presetting Stage (●):

Presetting is an important conditioning step to dry the blocks in order to create space and facilitate the diffusion of $CO_2$ within the block. This is done to achieve optimum carbonation degrees. From an extensive parametric study, a mass loss in the range of 35 to 40% of the total water in the block yields optimal results in terms of reaction. The residual water content in the block is somewhat of a critical parameter. Too much water hinders $CO_2$ diffusion; too little water results in water starvation. In both cases the carbonation reaction is limited. Therefore, there is an optimum water content that needs to be respected within the blocks before their carbonation. Water is integral as it is the medium for the multi-step carbonation reaction and where both $CO_2$ gas solvates and calcium-silicates dissolve. However, it does not only serve as a medium, but is also a reagent, where it is consumed to form C—S—H. Both C—S—H and CaCO3 precipitates form in sites previously occupied by the water medium in the pore structure.

For example, to calculate the mass of water that needs to be lost by a block, it is important to consider the aggregates' water absorption degree. The target mass loss per block, say 35%, can be calculated as such:

$$WL_{35\%} = [(M_{agg.} \times A_{agg.}) + (M_{block} \times \% \text{ Water})] \times 35\% \quad (3)$$

$WL_{35\%}$: Mass of 35% target water loss
$M_{Agg.}$: Mass of aggregates in block
$A_{Agg.}$: Absorption of aggregates
$M_{Block}$: Mass of block Carbonation and Self-Cleaning Concept (●):

The self-cleaning concept was developed to make sure that the $CO_2$ gas introduced into the chamber is fully consumed by the blocks, avoiding the release of gas to the atmosphere when opening the chamber for retrieval of the samples at the end of the carbonation cycle.

For this reason, the amount of $CO_2$ introduced into the chamber has to be carefully regulated and based on the optimum amount that can be absorbed by the processed blocks. We optimize this regimen by means of mass balancing the $CO_2$ feed and $CO_2$ uptake achievable by the blocks. Since we are confined by the volume of a pressure chamber and the operating pressure under which carbonation is carried at, feeding of $CO_2$ will need to be done in sequential increments until blocks reach their optimal storing capacity (~15-20% cement mass). The chamber will be intermittently replenished with $CO_2$ in response to pressure drops resulting from the reaction. Feeding is stopped once the entire mass of $CO_2$ that can be consumed by the blocks is supplied.

The number of times a chamber needs to be fully replenished with $CO_2$ depends on the volume of the chamber, total volume of the loaded blocks, $CO_2$ sequestration capacity of the blocks, and density of $CO_2$ gas at the given operating pressure. The number of chamber refills is assigned the symbol η, and presented in Equation 4 below:

$$\eta = \frac{\text{Mass CO2 absorbed by blocks}}{\text{Mass CO2 occupied by chamber freespace}} = \frac{(\% \text{ Cement in mix} \times M_{Block}) \times U_{CO2} \times Q}{[V_{chamber} - (V_{Block} \times Q)] \times K} \quad (4)$$

Where,
n: Number of chamber fillings
M Block: Mass of block (17-18 kg)
$U_{CO2}$: % CO2 uptake per cement mass (between 15-20%)
Q: Number of blocks loaded in chamber
$V_{chamber}$: Volume of chamber
$V_{Block}$: Volume of block (7.8 L)
K: Mass-volume constant (Table 2)

TABLE 2

Experimental calibration by filling a chamber with $CO_2$ gas till a specific pressure is reached and recording the associated weight gain.
Experimental Calibration, Chamber Volume = 5.65 L

| Pressure (psig) | CO₂ (g) | K (g/L) |
|---|---|---|
| 0 | 0 | 0 |
| 5 | 3.5 | 0.611 |
| 10 | 6.9 | 1.221 |
| 14.5 | 9.4 | 1.664 |
| 29.0 | 19.9 | 3.522 |
| 43.5 | 30.6 | 5.416 |
| 58.0 | 40.8 | 7.221 |
| 72.5 | 51.9 | 9.186 |

Values agree with, and were verified against, the ideal gas law (PV=nRT).

Limitation of this approach is that it does not account for $CO_2$ absorbed during the primary filling of the container, as the carbonation reaction is quite rapid at the initial stages of exposure. To address this, a $CO_2$ flowmeter can be employed to monitor the exact amount of gas injected into the chamber.

The $CO_2$ uptake achieved by the blocks is calculated by the equation below. During the course of carbonation, the reactions taking place are exothermic in nature (Eq. 1 and 2), and associate the release of heat. This is also met with the evaporation of residual water in the blocks. In order to properly determine the mass of $CO_2$ taken up by a block, the vaporized and condensed water within the chamber need to be collected and accounted for as shown below.

$$CO_2 Uptake_{per\ block} = (M_{Block(final)} - M_{Block(initial)}) + M_{Evaporated\ Water} \quad (5)$$

TABLE 3

Illustrative comparison between standard CMU and Carboclave units
Comparison of Concrete Masonry Units (CMU)

| Standard CMU | Carboclave Unit |
|---|---|
| Dimensions = 8 × 8 × 16 inch | Dimensions = 8 × 8 × 16 inch |
| Volume = 7.8 L | Volume = 7.8 L |
| Average Block wt. = 17.0 kg | Average Block wt. = 17.0 kg |
| Mix Proportions: | Mix Proportions: |
| Aggregate = 87% | Aggregate = 87% |
| Portland cement = 9.8% | Portland cement = 7.35% |
| Water = 3.38% | Newcem-plus = 2.45% |
| | Water = 3.38% |
| Portland cement use = 1.67 kg | Portland cement use = 1.25 kg |
| (1 kg cement generates 0.85 kg CO₂) | (1 kg cement generates 0.85 kg CO₂) |
| CO₂ footprint = 1.42 kg | CO₂ footprint = 1.06 kg |
| | Average CO₂ uptake per block ≈ 300 g (offset) |
| | Absolute CO₂ footprint = 1.06 − 0.30 = 0.76 kg |
| | Equivalent reinforcing nano-CaCO₃ = 681.2 g |
| | Distinguishing Properties: |
| | Lower porosity, pore diameter, and pore connectivity |
| | Improved freeze/thaw resistance |
| | Improved sulfate-attack resistance |
| | Improved ingress resistance |
| | Improved resistance to carbonation shrinkage |

The present invention will be more readily understood by referring to the following examples which are given to illustrate the invention rather than to limit its scope.

Example 1

Field Test Calculations

Figure 4:
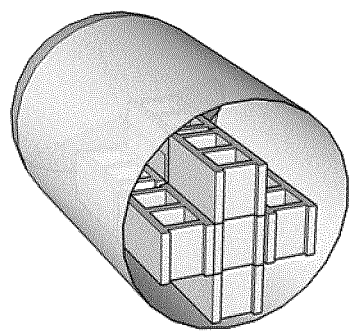
FIG. 4 illustrates the schematic view of the chamber with Carboclave masonry units inside.

The following scenario was experimentally tested.
# of blocks (Q)=10 as shown in FIG. 4.
Volume of Chamber ($V_{chamber}$)=287 L
Mass of block ($M_{Block}$)=17 kg
Avg. $CO_2$ uptake by cement mass ($U_{CO2}$)=18%
Volume of one block ($V_{Block}$)=7.8 L
Pressure of chamber ($P_{chamber}$)=15 psi
Absorption by aggregates ($A_{agg.}$)=3%
Mix design:
Aggregates: 87.00%
Cement: 7.35%
SCM: 2.45%
Water: 3.38%
Presetting water loss, according to Equation 3:

$$WL35\% = [[(17\ kg \times 0.87) \times 0.03] + [17\ kg \times 0.0338]] \times 0.35 = 0.356\ kg$$

A demolded block of 17 kg needs to lose a target 0.356 kg of water prior to undergoing carbonation.

Number of chamber fillings for the given scenario, according to Equation 4:

$$\eta = \frac{(0.097 \times 17{,}000 \text{ g}) \times 0.18 \times 10}{[287 \text{ L} - (7.8 \text{ L} \times 10)] \times 1.664 \text{ g/L}} = \frac{2968.2 \text{ g}}{347.7 \text{ g}} = 8.5$$

$K$ @ 15psi (from Table 3) = 1.664 g/L (i.e. 9.4 g/5.65 L)

The 10 blocks can absorb a total of 2968.2 g of $CO_2$. Respecting the maximum operating chamber pressure of 15 psi, complete refilling of the chamber will need to be carried out 8.5 times. (Filling the freespace of the chamber to 15 psi amounts to a total $CO_2$ mass of 347.7 g).

Figure 5:
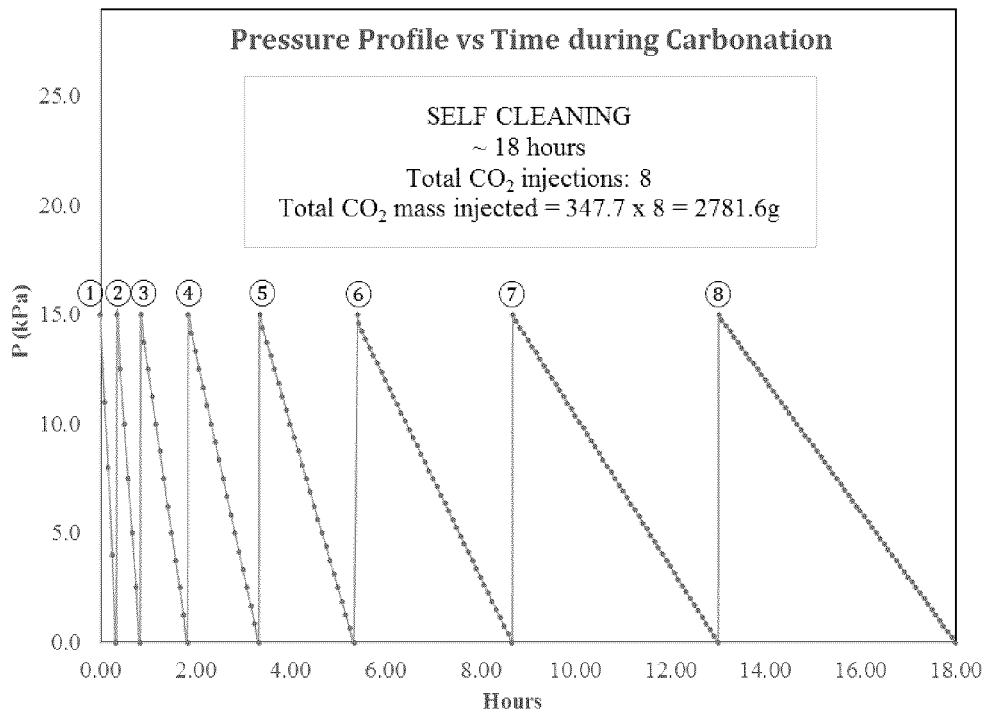
FIG. 5 illustrates a graph that traces the interior gas pressure profile inside the experimental pilot chamber.

FIG. 5 illustrates a graph that traces the pressure profile inside the chamber. After approximately 18 hours, 94% of the $CO_2$ that can be consumed by the blocks was achieved.
CO2 uptake per block, according to Equation 5:
Total evaporated water collected=986 g
Water evaporated per block=986/10=98.6 g
Average CO2 Uptake per block=304±35.6 g CO2
Average 1-day Compressive Strength of Carboclave blocks=22.6±1.4 MPa
Average 1-day Compressive Strength of Hydrated reference blocks=16.6±1.1 MPa Example 2

Full Scale Pilot

This site pilot was a step closer towards the practical realization of carbonation curing at Boehmers (by Hargest Block). CMU's were the precast products for this commercial pilot. The data shared in this report details the three major manufacturing process: 1. the pre-carbonation drying step; 2. low-pressure carbonation; and 3. the 'self-cleaning' soak. Two full scale trials were conducted over the four day testing period, differentiated by the varied concrete mix-design batches. The first trial was conducted on normal-weight concrete, and referred to for short as the "Day 1" batch. The "Day 2" batch consisted of light-weight blocks. A 2-day period was allocated for each trial in order to accommodate the time-consuming steps of drying and carbonation. A summary of the results are tabulated below.

For the Day 1 trial, drying was unassisted and lasted 16 hours. Carbonation prolonged for 24 hours and an average uptake of 0.435 kg (0.96 lbs) $CO_2$ was achieved per normal-weight block. An initial purge was implemented for this trial to help flush out the residing air in the autoclave. An open release valve resulted in some reading discrepancies since it contributed to partial depressurization of the autoclave. For the Day 2 trial, all release-valves were capped, and initial purging avoided. The lightweight blocks achieved an average $CO_2$ uptake of 0.356 kg (0.78 lbs) per block. Their full sequestration potential could not be reached as a result of high moisture content, beyond optimum levels for effective carbonation. A higher degree of drying needed to be achieved.

For future considerations, a minimalist purging approach can be regimented by aid of a $CO_2$ sensor affixed to the furthest release valve, where purging is halted as soon as a slightly elevated concentration of $CO_2$ is detected. Drying can be expedited by fan/heat assistance, to reduce processing time. The target water loss for the normal-weight concrete should be between 35 and 40% of initial water, and a minimum of 40% for the lightweight blocks.

TESTING SUMMARY

| | DAY 1 | | DAY 2 | |
|---|---|---|---|---|
| | Normal Weight (7 racks) | | Light-Weight (8 racks) | |
| | Normal Weight - High-Strength (1 rack) | | Light-Weight - High-Strength (1 rack) | |
| | Normal Weight - 25% Newcem-plus SCM (1 rack) | | | |
| Casting: | @ 2 pm (Dec. 15) | | @ 12 pm (Dec. 16) | |
| Drying: | 2pm-5:30am (Dec. 16), 15.5 hrs | 29.2-38.6% water loss | 12pm-6am (Dec. 17), 18 hrs | 25.4-34.9% water loss |
| Carbonation: | 6:30am-6am (Dec. 17), 24 hrs | 0.9-1.0 lb $CO_2$/block | 9am-10am (Dec. 18), 25 hrs | 0.7-0.8 lb $CO_2$/block |
| Strength: | (4 readings) | 26.8-33.9 MPa | (2 readings) | 17.0-20.5 MPa |

Day 1: Normal Weight Concrete Blocks

The autoclave can take up to 9 racks of concrete blocks. For this trial, 1 rack was reserved for a High-Strength blocks, and another rack for blocks using 25% Newcem-plus as an SCM. The remaining racks were normal weight concrete. Based on previous findings, the total $CO_2$ uptake that could potentially be consumed in this trial was worked out to be 1,264 kg (2780 lbs). This breakdown is shown below.

Projected $CO_2$ Uptake:

| 9 Racks total per kiln ⇔ | 468 Blocks per rack ⇔ 4212 Blocks total |
|---|---|
| 1 Batch = 122 blocks ⇔ | Rack = 4 batches |

| For Day 1: | |
|---|---|
| 7 Racks Normal weight blocks: | 7 × 468 = 3276 blocks (~300 g $CO_2$/block) |
| 1 Rack Normal weight, 25% Newcem-plus: | 1 × 468 = 468 blocks (~200 g $CO_2$/block) |
| 1 Rack Normal weight, High-Strength: | 1 × 468 = 468 blocks (~400 g $CO_2$/block) |
| TOTAL = 4212 blocks (~1264 kg $CO_2$ Stored) | |

| MIX DESIGN B NORMAL WEIGHT, HIGH-STRENGTH, 17.9 kg/unit | | |
|---|---|---|
| Aggregates | 14.62 kg | 81.70% |
| PC | 2.38 kg | 13.30% |
| Water | 0.90 kg | 5.04% |
| w/c | 0.38 | |

| MIX DESIGN A NORMAL WEIGHT, 16.8 kg/unit | | |
|---|---|---|
| Aggregates | 14.62 kg | 87.00% |
| PC/25% NewCem+ | 1.63 kg | 9.70% |
| Water | 0.56 kg | 3.33% |
| w/c | 0.35 | |

Water absorption by aggregates:
Absorption by Sand ~4%
Absorption by Agg. ~2%
AVG. Absorption assumed ~3%

TABLE 4 example calculation for target water loss in a normal-weight block
WATER LOSS CALCULATIONS (e.g. Normal weight block)

| | | |
|---|---|---|
| Initial Block wt.: | | 16,800 g [1] |
| Mix Water | Water in Agg. (__3__% abs [3]) | |
| [1] × 3.33% = __560__ g [2] | [1] × [3] × 87% = __438__ g [4] | |
| Total Initial Water: | | [2] + [4] = __998__ g [5] |
| Target Water Loss: | | 30.0% |
| g Target Water Loss: | | [5] × 30.0% = __299__ g [6] |
| Target Block Weight: | | [1] − [6] = __16501__ g |

For the Day 1 trial, a total of 4 blocks were retrieved from the production line during casting to serve as the representative control specimens for profiling the water loss during the drying step, and quantifying the $CO_2$ uptake from the weight differential after carbonation. The freshly cast blocks were collected during the preparation of different racks. The preparation of an entire charge normally takes 3 hours. Loading and unloading lasts 1 hour each.

Table 5 summarizes the results associated with each monitored block for the Day 1 trial. All blocks achieved their minimum required water loss except for Block 1-3. This block represented the 'high-strength' concrete batch, which was expected to take longer since this mix design entailed a higher total water content in the initial block, and also contained more cement than the original normal weight blocks.

build-up for the first 1.5 hours since an initial purge was executed in order to flush the autoclave's residing air. Purging was stopped as soon as a high $CO_2$ concentration was detected atop the exterior stack, after which the back valve was closed and pressurization initiated. The primary fill of the autoclave to 10 psi took 55 min. A significant amount of the carbonation reaction was expected to have occurred during the purge and initial filling of the chamber. This extent of the reaction could not be accounted for through monitoring the autoclave's pressure drop and/or recording the decrease of $CO_2$ levels in the tanks, since these methods could not differentiate the fraction of $CO_2$ reacted with the blocks and the fraction emitted through the exhaust stack. More specific methods are more accurate, such as monitoring the individual block's weight differential, or

TABLE 5

Tabulated results for the monitored blocks of the Day 1 trial
DAY 1 TRIAL RESULTS

| Block ID: | ①-① | ①-② | ①-③ | ①-④ |
|---|---|---|---|---|
| Obtained from casting of rack: | 3 | 2 | 1 | 9 |
| Description: | Normal-weight | Normal-weight 25% Newcem SCM | Normal-weight High-Strength | Normal-weight |
| Mix Design: | A | A | B | A |
| Casting wt. (g): | 17,767 | 18,032 | 18,312 | 18,294 |
| Target water loss (%): | 30 | 30 | 30 | 30 |
| Actual water loss (%): | 38.8 | 36.8 | 29.2 | 38.6 |
| Pre-carbonation wt. (g): | 17,244 | 17,278 | 17,794 | 17,636 |
| Post-carbonation wt. (g): | 17,570 | 17,588 | 18,154 | 17,980 |
| *Adjusted final wt. (g): | 17,670 | 17,688 | 18,254 | 18,080 |
| Δ wt. $CO_2$ (g): | 426 | 410 | 460 | 444 |
| Δ wt. $CO_2$ (lb): | 0.9 | 0.9 | 1.0 | 1.0 |
| Strength (MPa): | 33.9 | — | — | — |
| Strength of arbitrarily chosen blocks (MPa): | | 28.3 (Rack 4, top of rack) 29.3 (Rack 5, mid rack) 26.8 (Rack 6, bottom of rack) | | |

*Adjusted final weight - accounts for water lost by blocks during carbonation, which from previous trials was found to equal around ~100 g per block.

Figure 6:
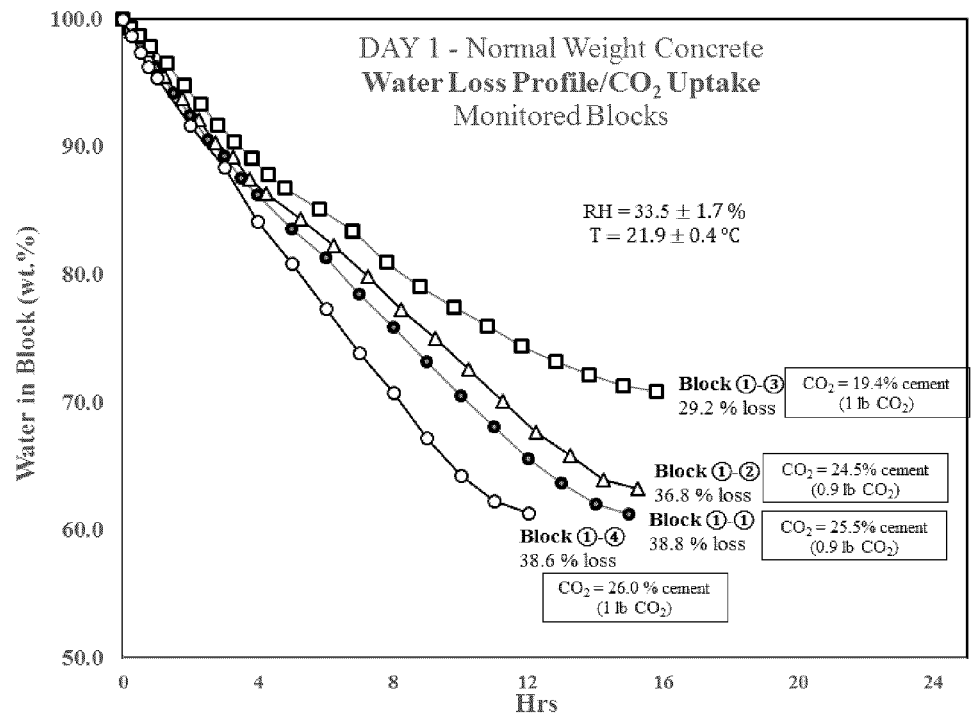
FIG. 6 illustrates water loss profile for the monitored blocks and their resulting CO2 uptakes, expressed in weight % of initial cement content, for the first commercial-scale test carried out at an industrial autoclave.

Interestingly, the monitored blocks achieved higher $CO_2$ uptakes than in the previous miniature site tests. This could be due to a more precise and regimented drying process. The "adjusted final weight" values correct for water loss arising from the carbonation of the blocks. On average, each block experiences ~100 g weight drop, a value that was repeatedly and carefully measured during previous miniature site tests. FIG. 6 shows the water loss profile for the monitored blocks and expresses the respective $CO_2$ uptake values in terms of weight fraction of initial cement content. As shown, the block with the highest water loss achieved the highest carbonation degree.

Figure 7:
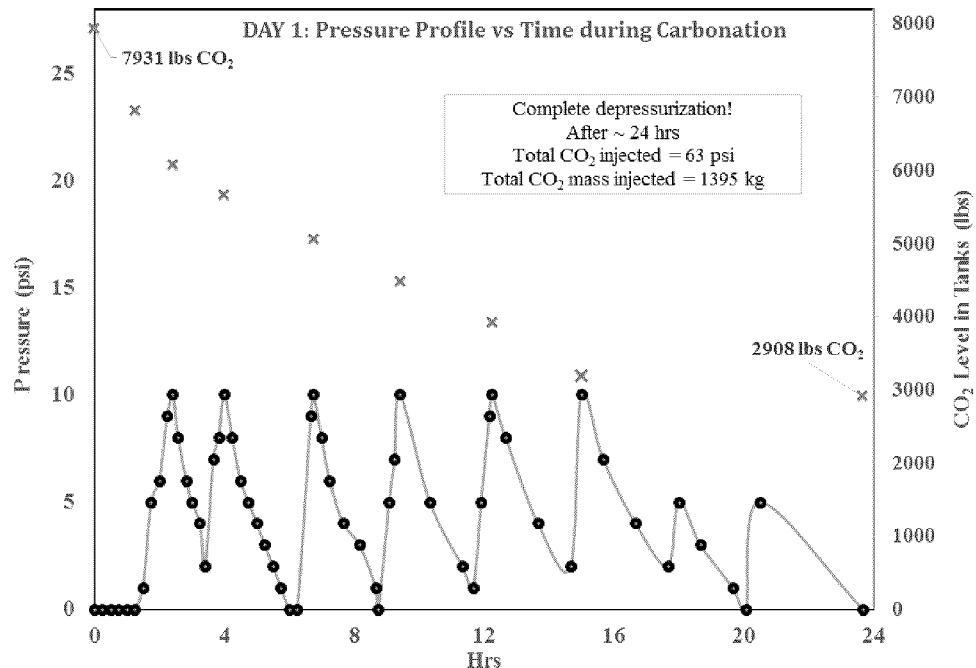
FIG. 7 illustrates pressure log within the industrial autoclave throughout the carbonation process, and cumulative CO2 level in the gas tanks displayed on the secondary vertical axis.

FIG. 7 displays the pressure log of the autoclave recorded throughout the carbonation process. There was no pressure conducting thermal decomposition analysis as this technique is the most effective in determining the absolute $CO_2$ content within a block.

Over a carbonation period of 24 hours around 6 fills were injected, which by conversion to mass equivalents from the calibration curve cumulatively amount to a total sequestration of 1395 Kg (3069 lbs) CO2, or an average of 0.76 lbs/block. This may not be very accurate since this approach fails to account for the blocks' carbonation engagement during the purging step and subsequent fillings. Also, during this trial one of the autoclave's release valves was open, thereby partially contributing to the depressurization of the autoclave. This made deductions solely from the pressure log slightly unreliable. An alternate approximation was through monitoring tank level drops, which indicate that a total of 5023 lbs (2283 kg) $CO_2$ were emptied from the tanks for the Day 1 trial. Again, not the entire amount is expected to have been absorbed by the blocks since a considerable portion of the gas was ejected out of the autoclave during purging and the valve leak during carbonation. The more representative approximation was that obtained from the weight gain experienced by the monitored blocks (Table 5), which averaged an uptake of 0.435 kg (0.96 lb) $CO_2$ per block.

Nonetheless, the most accurate determination for the absolute $CO_2$ content of a block can be attained from thermal analysis, where weight loss between 650-850° C. is attributed to the release of $CO_2$ from the decomposition of $CaCO_3$, the primary product of carbonation. This analysis will be performed shortly on representative specimens obtained from each block.

Freeze-thaw and Sulfate-attack Performance:

The following table details standardized laboratory testing conducted to evaluate the performance of carbonated concrete subject to freeze-thaw cycling and sulfate-attack.

experienced the least longitudinal expansion. The deterioration mechanism is usually facilitated by the presence of $Ca(OH)_2$, an abundant by-product in concrete originating from the hydration of cement. Carbonated specimens display considerably lower $Ca(OH)_2$ content since these crystals are normally consumed by the carbonation reaction to form the much less-soluble CaCO3 precipitates. This, in effect, hinders the formation of gypsum and ettringite, which are key ingredients for deleterious dimensional instability and loss of strength.

Example 3

Day 2: Light-Weight Concrete Blocks

For the Day 2 trial, the autoclave was charged with lightweight concrete blocks. One of the racks was reserved for 'high-strength' lightweight blocks. Compared to the previous full-scale trial, a few modifications were made. 1. All release-valves were plugged to make sure depressurization of the autoclave was solely attributed to the carbonation of the blocks, and not from leakage. 2. No purging step was

TABLE 6

Freeze-Thaw and Sulfate-Attack testing as carried out by referenced study herein [1]

Figure 2:
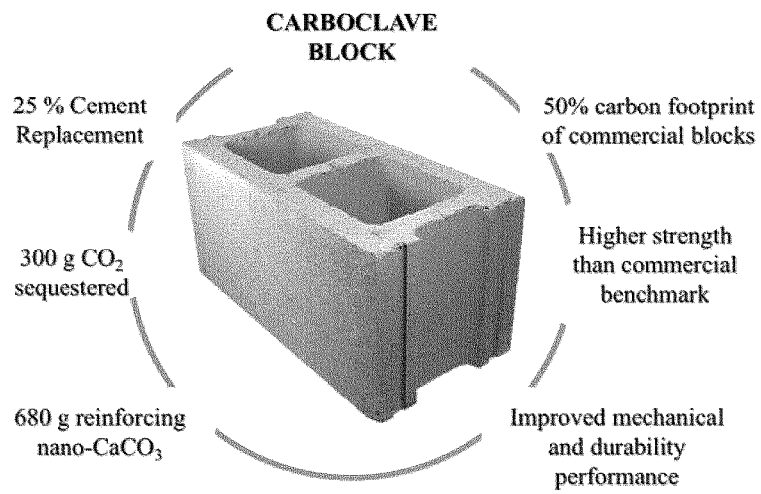
FIG. 2 illustrates a Carboclave masonry unit prepared as per the process flow diagram of FIG. 1.
Figure 3:
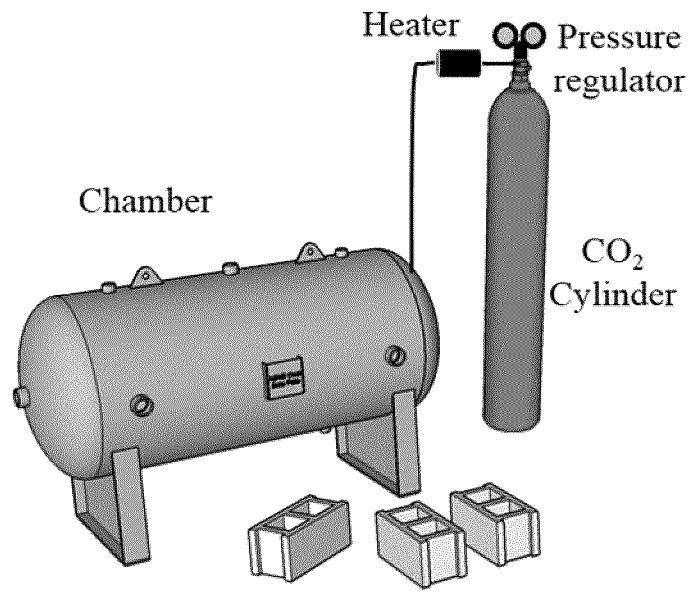
FIG. 3 illustrates the experimental pilot setup.

| Testing Protocol | Deterioration quantification | Experimental conditions | Results |
|---|---|---|---|
| Freeze-Thaw CSA A231.2 (1995) | Mass-loss due to deleterious internal expansion of water crystals | 3% NaCl solution<br>Concrete slabs: 40 × 76 × 127 mm<br>Mix Design:<br>Cement: 286 kg/m³<br>Agg.: 730 kg/m³<br>Sand: 1050 kg/m³<br>Water: 100 kg/m³<br>w/c = 0.35<br>18 hrs freezing @ −15° C.<br>6 hrs thawing @ 21° C.<br>20 cycles<br>Mass loss measured every 10 cycles | Results graphically depicted in FIG. 1<br>Slabs with 9% $CO_2$ uptake by cement mass yielded better resistance to F/T deterioration in this comparative study<br>Mass loss was the lowest for these slab specimens<br>The carbonation-modified surface lowers permeability, thereby reducing water ingress and therefore frost damage and scaling. |
| Sulfate Attack ASTM C1012 | Dimensional elongation of specimens immersed in sulfate solution | 5% $Na_2SO_4$<br>mortar bars: 25 × 25 × 285 mm<br>cement/sand: 1/2.75<br>w/c = 0.36<br>length of bars monitored weekly | Results graphically depicted in FIG. 2<br>Carbonated bars displayed better resistance to sulfate attack<br>These bars measured the least longitudinal expansion<br>Improved performance possibly owed to the reduced gypsum and ettringite formation as a result of carbonation's consumption of hydration product $Ca(OH)_2$. |

[1] Rostami, V.; Shao, Y.; Boyd, A. J. Carbonation Curing versus Steam Curing for Precast Concrete production. Journal of Materials in Civil Engineering, 2012, 24(9), 1221-1229.

Figure 8:
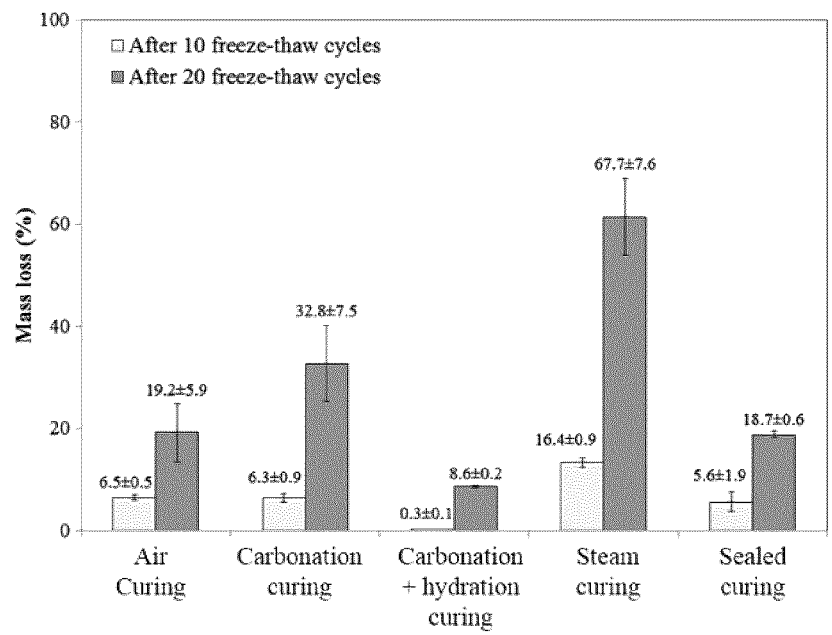
FIG. 8 illustrates mass loss after 10 and 20 Freeze-Thaw cycles for differently cured masonry concrete slabs (Prior Art)

FIG. 8 shows that the carbonated masonry slabs generally performed better than the steam-cured batch. The best performance was displayed by the batch subject to carbonation and followed by subsequent hydration. Subsequent hydration was achieved by replenishing the slabs via intermittent water spraying (this could have also been achieved by placing the slabs in a fog room, i.e. 100% relative humidity). This batch appeared intact post testing and only amounted to an overall mass loss of 8.6% after 20 freeze-thaw cycles, compared to the heavily fragmented steam-cured slabs, which experienced almost 68% mass loss under the same exposure conditions.

Figure 9:
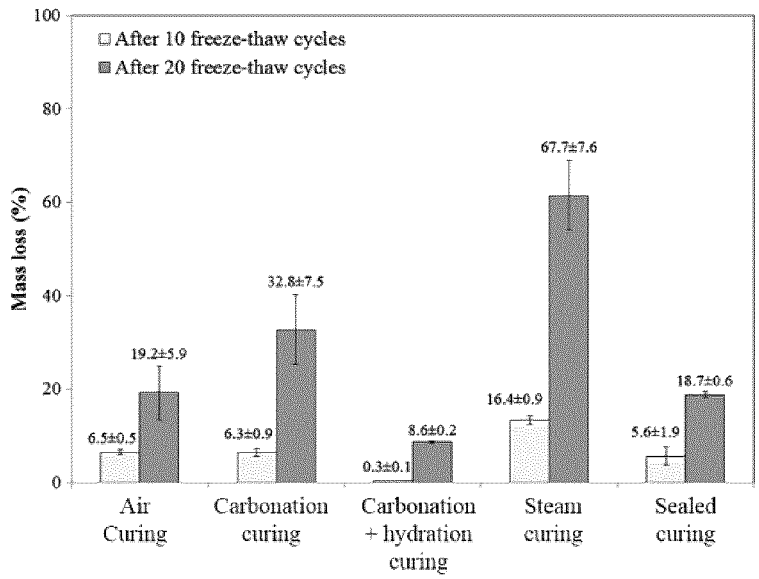
FIG. 9 illustrates elongation of mortar bars under sulfate attack for differently cured specimens (Prior Art)

FIG. 9 summarizes the sulfate-induced deterioration for differently cured mortar bars. Again, the carbonated specimens demonstrated the most dynamic stability, as these bars implemented, i.e. a closed system from beginning to end. 3. Carbonation pressure was raised to 14 psi rather than 10 psi. This will help reduce the number of autoclave refills.

Lightweight blocks should be able to achieve higher $CO_2$ uptakes than normal weight blocks as their mix design includes a higher cement content. However, these blocks require more intense drying since they contain 1.5 times the initial water content of normal concrete. The expanded-slag aggregates used in these blocks exhibit high water absorption behavior. For this reason, the drying of the full charge of blocks was assisted by fanning the tunnel from both ends.

The total $CO_2$ uptake that could potentially be consumed in this trial was worked out to be 1,395 kg (3069 lbs), according to the following breakdown:

Projected $CO_2$ Uptake by Kiln:

| 9 Racks total per kiln ⇔ Batch = 122 blocks ⇔ | 468 Blocks per rack ⇔ 4212 Blocks total 1 Rack = 4 batches |
|---|---|
| For Day 2: | |
| 8 Racks lightweight blocks: | 8 × 468 = 3744 blocks (~315 g $CO_2$/block) |
| 1 Rack lightweight, High-Strength: | 1 × 468 = 468 blocks (~460g $CO_2$/block) |
| TOTAL = 4212 blocks (~1395 kg $CO_2$ Stored) | |

| MIX DESIGN C LIGHT-WEIGHT, 14.2 kg/unit | | | MIX DESIGN D LIGHT-WEIGHT, HIGH-STRENGTH, 15.1 kg/unit | | |
|---|---|---|---|---|---|
| Sand | 1.25 kg | 8.80% | Stone | 0.51 kg | 3.35% |
| Exp. Slag | 10.42 kg | 73.40% | Exp. Slag | 10.78 kg | 71.40% |
| PC | 1.87 kg | 13.20% | PC | 2.76 kg | 18.30% |
| Water | 0.67 kg | 4.62% | Water | 1.05 kg | 6.95% |
| w/c | 0.35 | | w/c | 0.38 | |

Water loss:
Absorption by Sand ~4%
Absorption by Agg. = 8%
Assume absorption only by expanded slag, with an average of = 7.5%

TABLE 7 example calculation for target water loss in a light-weight block
WATER LOSS CALCULATIONS (e.g. lightweight block)

| | |
|---|---|
| Initial Block wt.: | _____14,200_____ g ① |
| Mix Water | Water in Agg. (__7.5__% abs ③ ) |
| ① × 4.62% = __656__ g ② | ① × ③ × 82.2% = __875__ g ④ |
| Total Initial Water: | ② + ④ = __1531__ g ⑤ |
| Target Water Loss: | 30.0% |
| g Target Water Loss: | ⑤ × 30.0% = __460__ g ⑥ |
| Target Block Weight: | ① − ⑥ = __13,740__ g |

Again, 4 blocks were retrieved from the production line during casting to serve as the representative control specimens for profiling the water loss during the drying step, and quantifying the $CO_2$ uptake from the weight differential after carbonation.

TABLE 8

Tabulated results for the monitored blocks of the Day 2 trial
DAY 2 TRIAL RESULTS

| Block ID: | ②-① | ②-② | ②-③ | ②-④ |
|---|---|---|---|---|
| Obtained from casting of rack: | 3 | 6 | 1 | 9 |
| Description: | Lightweight | Lightweight | Lightweight High-Strength | Lightweight |
| Mix Design: | C | C | D | C |
| Casting wt. (g): | 15,000 | 15,049 | 15,562 | 14,834 |
| Target water loss (%): | 30 | 30 | 30 | 30 |
| Actual water loss (%): | 34.0 | 34.9 | 25.4 | 25.6 |
| Pre-carbonation wt. (g): | 14,398 | 14,432 | 14,975 | 14,288 |
| Post-carbonation wt. (g): | 14,668 | 14,698 | 15,254 | 14,496 |
| *Adjusted final wt. (g): | 14,768 | 14,798 | 15,354 | 14,596 |
| Δ wt. $CO_2$ (g): | 370 | 366 | 379 | 308 |
| Δ wt. $CO_2$ (lb): | 0.8 | 0.8 | 0.8 | 0.7 |

TABLE 8-continued

Tabulated results for the monitored blocks of the Day 2 trial
DAY 2 TRIAL RESULTS

| Block ID: | ②-① | ②-② | ②-③ | ②-④ |
|---|---|---|---|---|
| Strength (MPa): | — | — | 17.0 | — |
| Strength of arbitrarily chosen blocks (MPa): | | 20.5 (Rack 8) | | |

*Adjusted final weight - accounts for water lost by blocks during carbonation, which from previous trials was found to equal around ~100 g per block.

Figure 10:
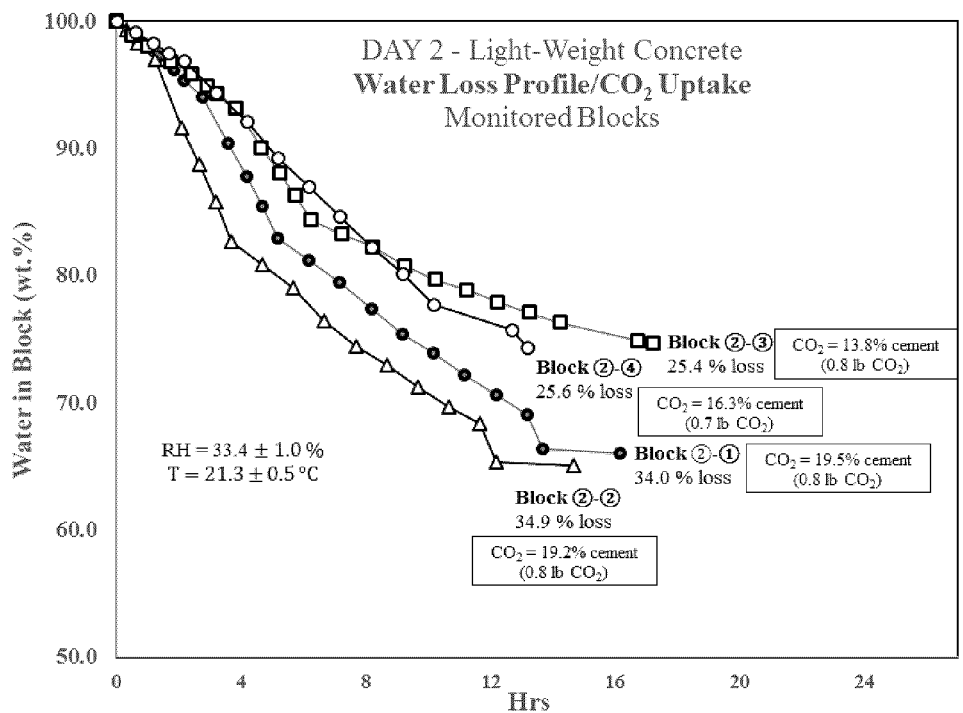
FIG. 10 illustrates water loss profile for the monitored blocks and their resulting $CO_2$ uptakes, expressed in weight % of initial cement content, for the second commercial-scale test carried out at an industrial autoclave.
Figure 11:
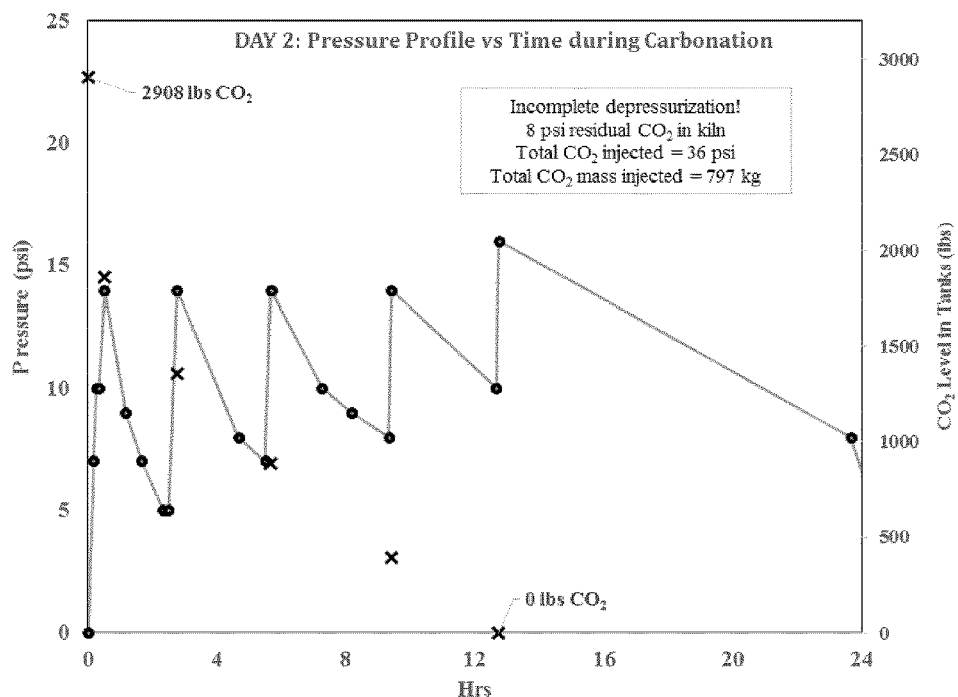
FIG. 11 illustrates Pressure log of autoclave throughout the carbonation process, and cumulative $CO_2$ level in the gas tanks displayed on the secondary vertical axis.

Results for this trial's monitored blocks are summarized in Table 8. The water loss profile for the blocks are graphed in FIG. 10. Both blocks 2-3 and 2-4 could not reach their target water loss. Consequently, they displayed the least carbonation reactivity in terms of cement engagement. The blocks of this trial have a much higher sequestration potential than the normal-weight blocks of the Day 1 trial, but were unable to reach their optimum $CO_2$ reactivity. Closer visual and numerical observations seemed to suggest that the blocks were slightly more water saturated than required, an effect that hinders the diffusion of $CO_2$ within the blocks and, therefore, overall reactivity. The expanded slag aggregates used in these blocks have a high absorption (~8%), which may be inflicting a saturation effect as it replenishes the cement paste with water during carbonation. A minimum loss of 40% of total initial water may prove more appropriate for these blocks. It is highly recommended that drying of these blocks be thoroughly assisted. The log for the internal pressure of the autoclave is graphically depicted in FIG. 11, along with the cumulative $CO_2$ levels in the tanks. The initial filling of the autoclave to 14 psi lasted 30 min, considerably faster than the previous full-scale. This is largely owed to capping all release valves (no leaks) and also adjusting for a higher flow-rate. The autoclave was manually regulated at 14 psi by replenishing the $CO_2$ gas after each considerable pressure drop. At the 13 hour mark, all the remaining $CO_2$ in the tanks was pushed into the autoclave, which resulted in a surge in pressure to 16 psi. The inlet was then closed. At the 24 hour mark, the internal pressure was 8 psi, which meant that not all the injected $CO_2$ was absorbed by the blocks, and the residual gas was released into the exhaust stack. Self-cleaning could not be attained. This is primarily due to the high moisture content of the blocks.

TABLE 9

$CO_2$ uptake approximations as determined by different approaches
DAY-1: $CO_2$ Uptake (4209 blocks)

| | | | | Remarks |
|---|---|---|---|---|
| | Recording $CO_2$ tank level drop | | | |
| Approach 1: | Total $CO_2$ | $CO_2$/block (kg) | $CO_2$/block (lbs) | Amount not fully absorbed by blocks as there was residual gas at the end of carbonation that had to be flushed out |
| | 1322 kg | 0.314 kg/block | 0.69 lbs/block | |
| | Mass conversion of autoclave's internal pressure log | | | |
| Approach 2: | Total $CO_2$ | $CO_2$/block | $CO_2$/block | Does not account for reaction occurring during filling steps. |
| | 797 kg | 0.189 kg/block | 0.42 lbs/block | |
| | Average weight differential of monitored blocks | | | |
| Approach 3: | Total $CO_2$ | $CO_2$/block (kg) | $CO_2$/block (lbs) | More accurate than preceding two approaches |
| | 1498 Kg | 0.356 kg/block | 0.78 lbs/block | However, results only based on the 4 monitored blocks |
| | Thermal decomposition of $CaCO_3$ between 650-850° C. | | | |
| Approach 4: | Total $CO_2$ | $CO_2$/block (kg) | $CO_2$/block (lbs) | Most accurate determination of the absolute $CO_2$ content |
| | ? | ? | ? | |

For this Day 2 trial, no purging was implemented and all valves were tightly capped. This meant that the depressurization of the autoclave was solely owed to the blocks' reaction with $CO_2$. Table 9 lists the different approaches used to approximate the $CO_2$ uptake. The individual bulk approaches of monitoring tank levels and autoclave logs may not be accurately reflective since not all the gas injected was fully consumed, and reactions occurring during fillings could not be accounted for by these approaches. From the weight gain of monitored blocks, the average $CO_2$ uptake measured was 0.356 kg (0.78 lbs) $CO_2$ per block.

FIGS. 12 through 20 are ones taken for the abovementioned examples pertaining to the commercial pilot trials.

Table 10 below displays how Carboclave blocks compare to Beohmer's own premium autoclave products. While heavier and denser due to carbon loading, Carboclave blocks also associate higher physical resilience, as clearly demonstrated by strength values.

TABLE 10

Average values for 20 cm masonry blocks prepared via conventional autoclaving and via Carboclave technology.
Boehmers Normal Weight 20 cm Masonry Blocks

| Physical Property | Autoclave | Carboclave |
|---|---|---|
| Oven Dry Mass (kg) | 16.511 | 16.965 |
| Density (kg/m³) | 2129 | 2213 |
| Absorption (%) | 5.924 | 4.990 |
| Suction (%) | 0.670 | 0.174 |
| Dry Shrinkage (%) | 0.0129 | 0.0196 |
| Splitting-tensile Strength, 1 day (MPa) | 1.83 | 2.04 |
| Compressive Strength, 1 day (MPa) | 23.6 | 35.6 |
| Compressive Strength, 28 day (MPa) | 27.2 | 52.5 |

Figure 21:
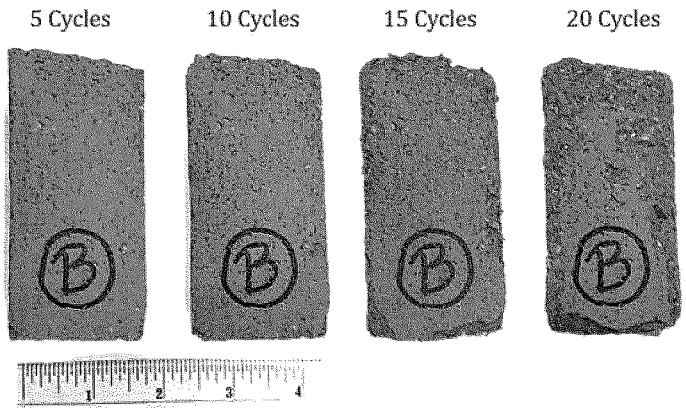
FIG. 21 Freeze/thaw cycling of cut sections from concrete blocks that underwent carbonation curing and conventional hydration curing. Graphs display the mass loss experienced after every fifth cycle.
Figure 21:
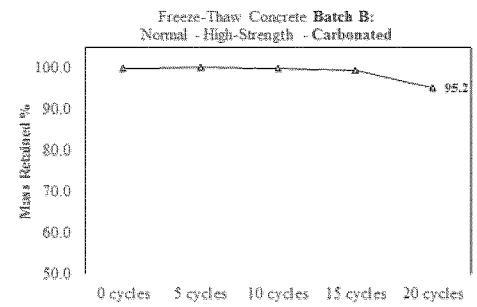
Figure 21:
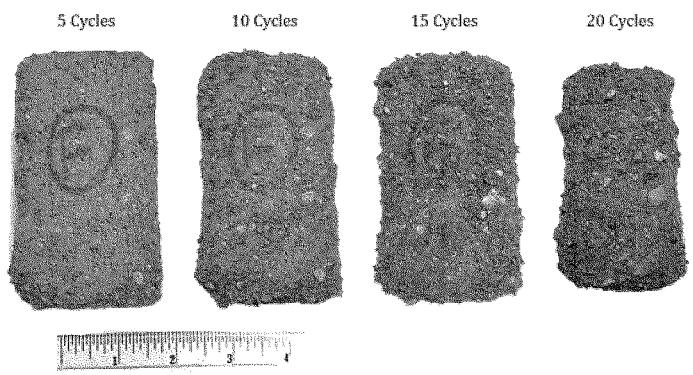
Figure 21:
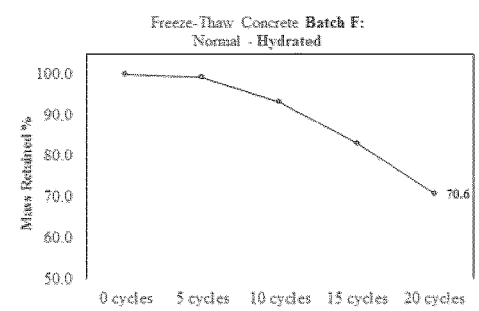

Increased Product Resilience:

Concrete mansonry units prepared via the presented Carboclave methodologies exhibit tangibly improvements in resilience durability. FIG. 21 summarizes results obtained from a standardized freeze/thaw cycling test. The results pictographically compare concrete specimens retrieved from a Carboclave masonry unit and an identical unit that had undergone conventional hydration. The adjacent graphs reveal plot the relatively intact, only losing 4.8% of its initial weight after 20 cycles, while the hydrated specimen lost 29.4% of its mass.

Figure 22:
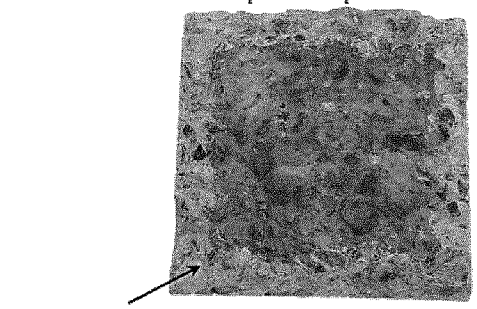
FIG. 22 Subsequent internal rehydration due to the encapsulation effect arising from the CaCO3 densified outer periphery of the concrete component. This promotes pH rebound, high subsequent strength gain, and protection of steel reinforcement. The graph reveals the strength of a Carboclave CMU after 1 day, and after 28 days.
Figure 22:
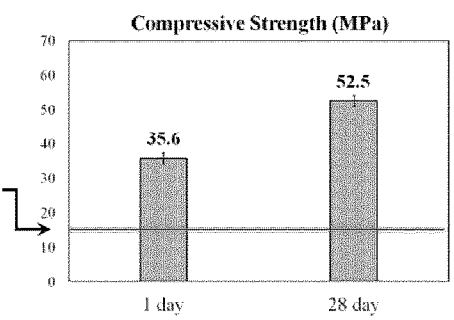

FIG. 22 reveals a phenolphthalein-sprayed cross section of a concrete slab prepared via Carboclave technology and left to hydrate for a subsequent 28 days. The cross-section reveal pH gradient, with a highly alkaline core and a less alkaline periphery, which experiences the heaviest degree of carbonation. This densified outer layer also functions as a form of encapsulation to promote further internal hydration of the unreacted cement portion within the concrete. The very high compressive strength achieved by Carboclave blocks after 28 days is a reflection of this feature. Moreover, this internal hydration also incurs a pH rebound effect, bringing the pH back up to alkaline ranges typical of normal concrete and re-promoting the passivation protection of steel-reinforcement where applicable.

Figure 12:
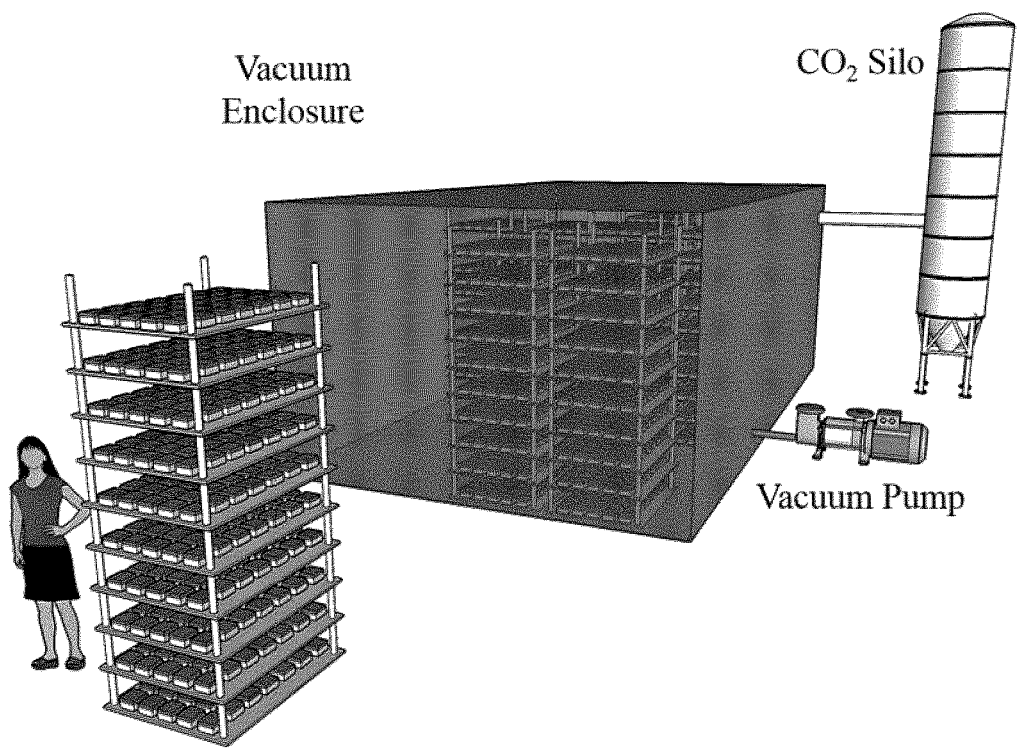
FIG. 12 is a schematic illustration of a polymer-based (geomembrane or polyurea) enclosure for concrete pavers capable of a vacuum pre-step prior to carbonation curing.
Figure 13:
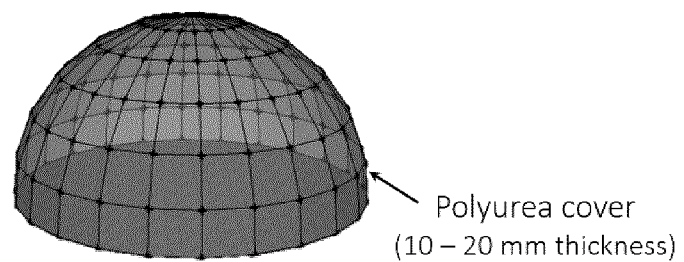
FIG. 13 is another embodiment of a flexible polymer enclosure that can also undergo a vacuum pre-step prior to carbonation curing. Such an assembly can be suitable for various precast products, especially pipes.
Figure 14:
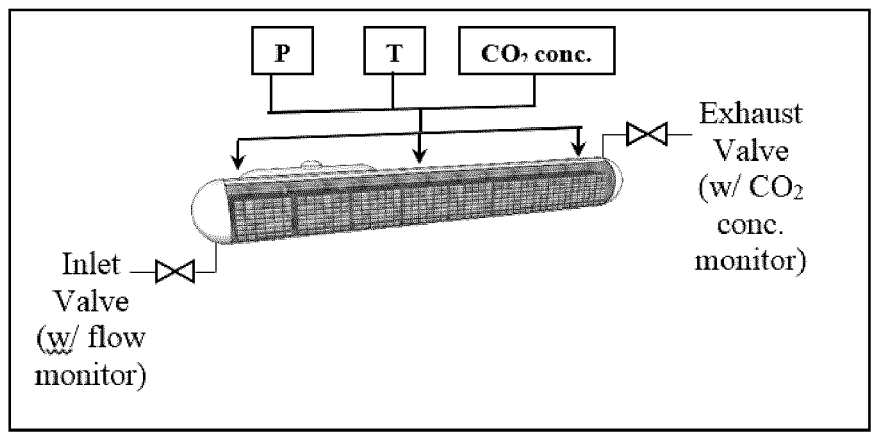
FIG. 14 is a simple illustration of an HMI display of the control system for an autoclave assembly.
Figure 15:
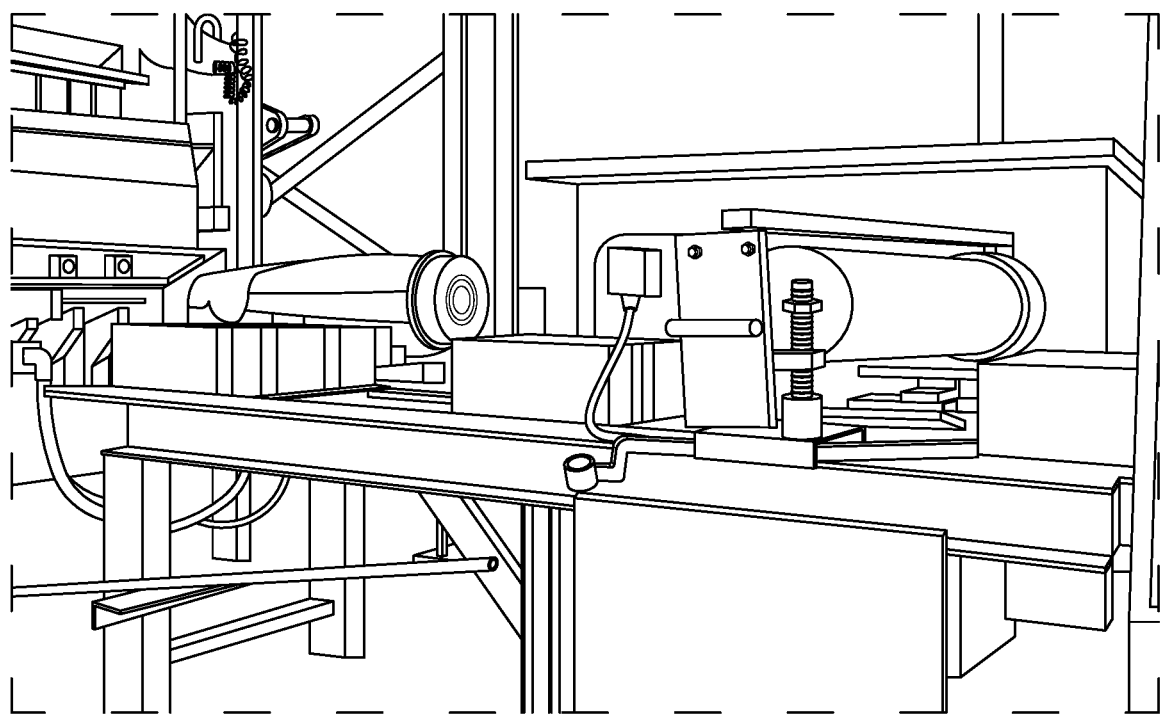
FIG. 15 concrete block forming of units to undergo commercial-scale carbonation as per Carboclave technology in an industrial autoclave assembly.
Figure 16:
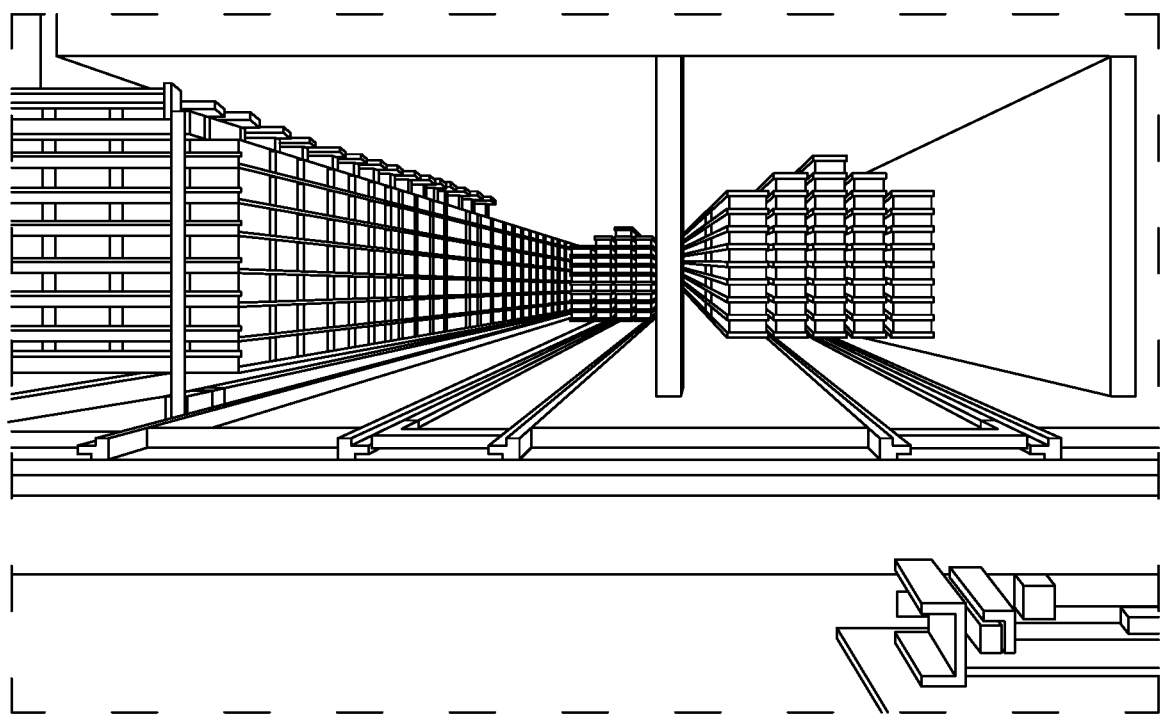
FIG. 16 closely-monitored presetting of concrete blocks in drying tunnel before being subject to carbonation curing.
Figure 17:
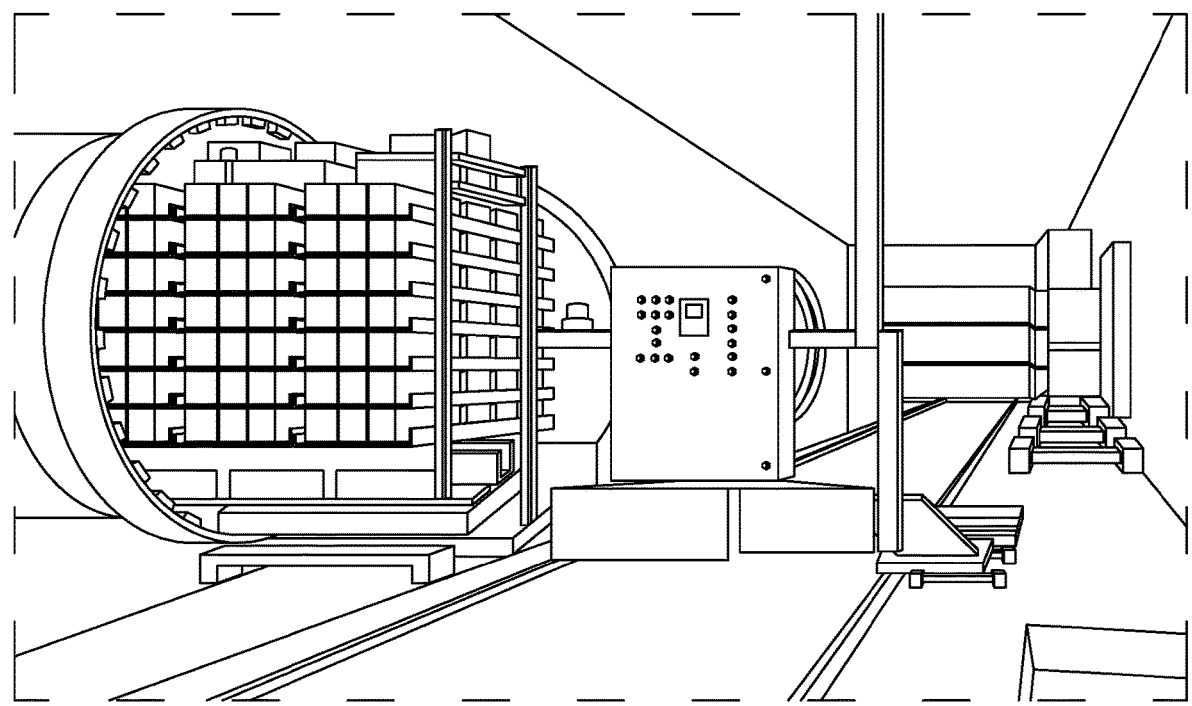
FIG. 17 loading of preset concrete blocks into autoclave.
Figure 18:
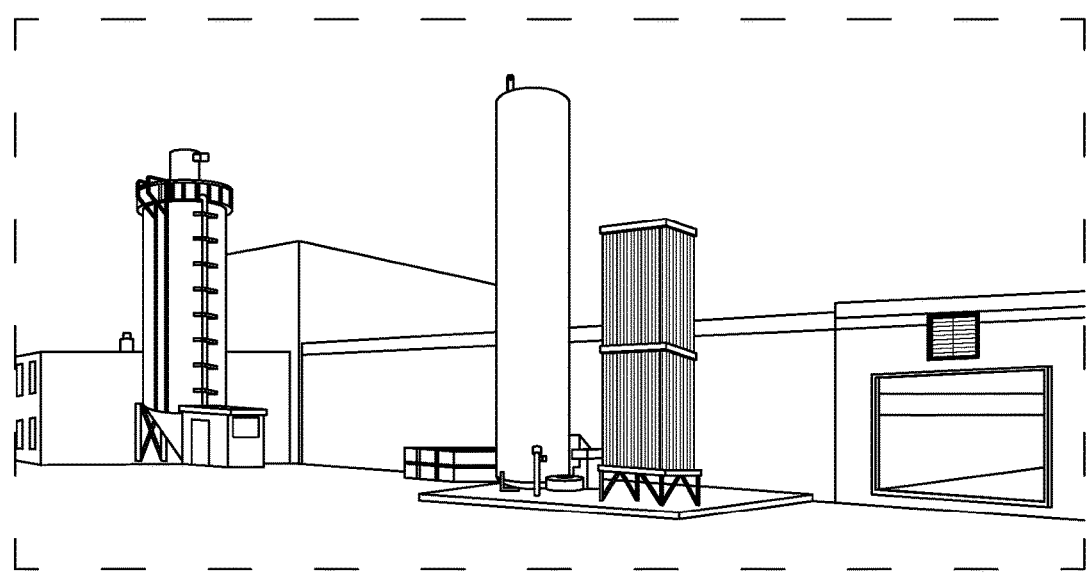
FIG. 18 Tank carrying liquefied by-product-sourced high purity CO2 gas and vaporizer assembly.
Figure 19:
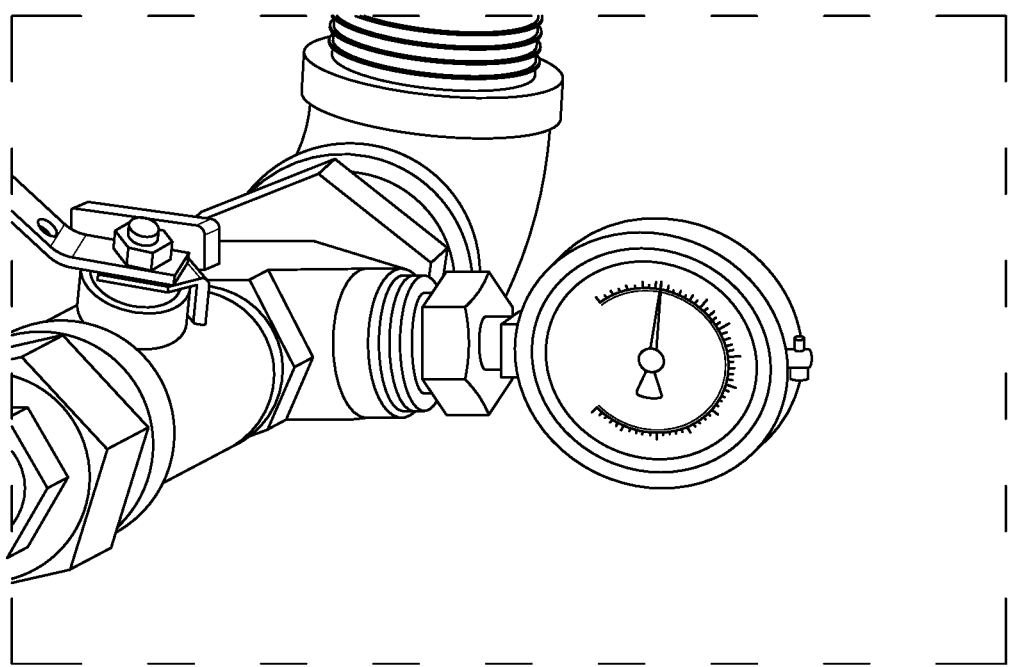
FIG. 19 Pressure gauge displaying interior autoclave pressure.
Figure 20:
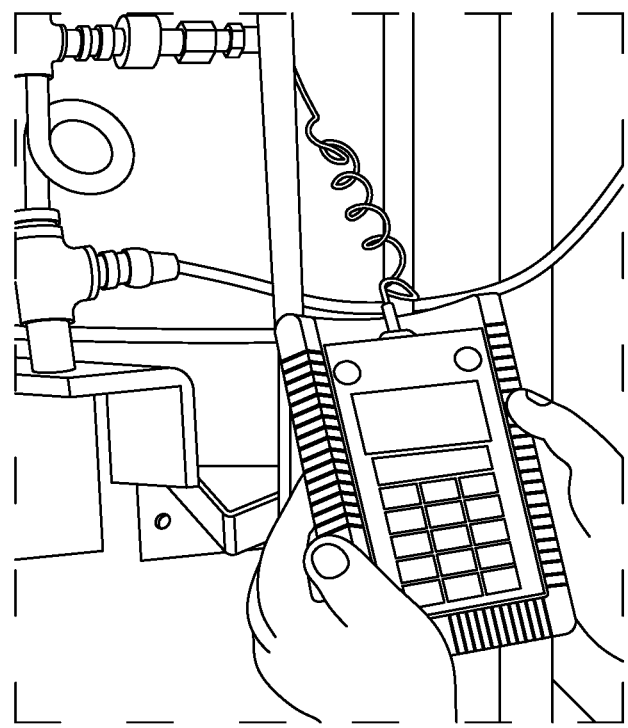
FIG. 20 Example of a CO2 and 02 concentration reading for the interior of the autoclave.

Other embodiments for Carboclave technology implementable in enclosure assemblies enabling near-ambient pressure conditions are presented in FIGS. 12 and 13.

Figure 23:
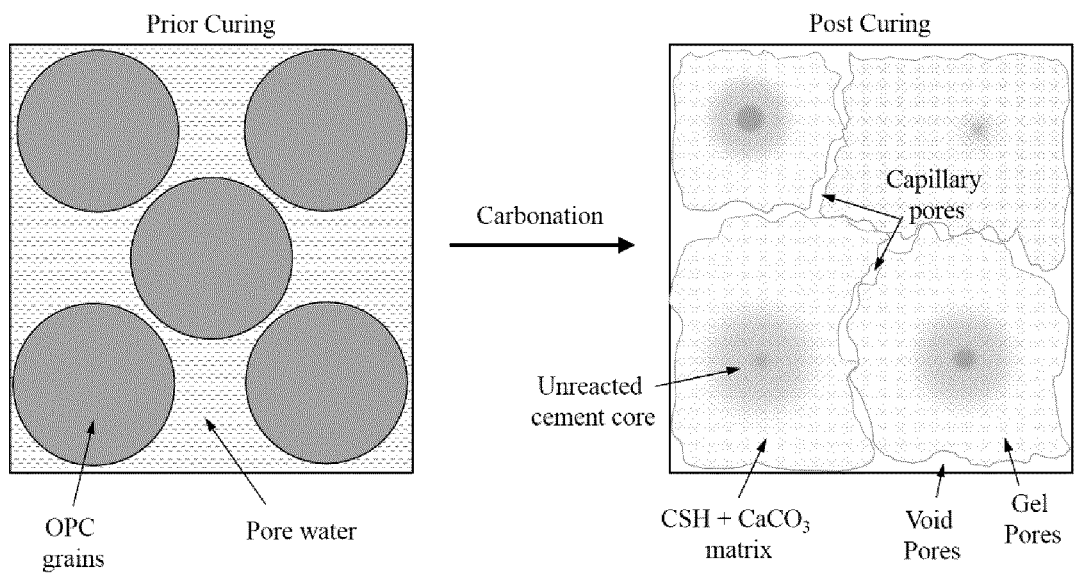
FIG. 23 Microstructural model for the pore structure of a cement paste slurry prior and post carbonation curing.

Theoretical Discussion:

To better illustrate the evolution of the pore structure of the cement paste as a result of carbonation, FIG. 23 presents a simplified microstructural schematic. In the initial paste (cement+water), cement grains are densely packed such that the small voids separating them constitute the pore structure. These voids are filled with water initially. After drying presetting, the voids become partially depleted of water, promoting enhanced gas permeation within the paste. After carbonation, the cement grains are almost entirely consumed to form reaction products CSH and $CaCO_3$, which form an enveloping composite matrix that is expansive due to a lower specific density. The ensuing pore structure comprises void pores, capillary pores, and gel pores (nano-pores within the CSH structure) as respectively indicated by the arrows in the figure.

Figure 24:
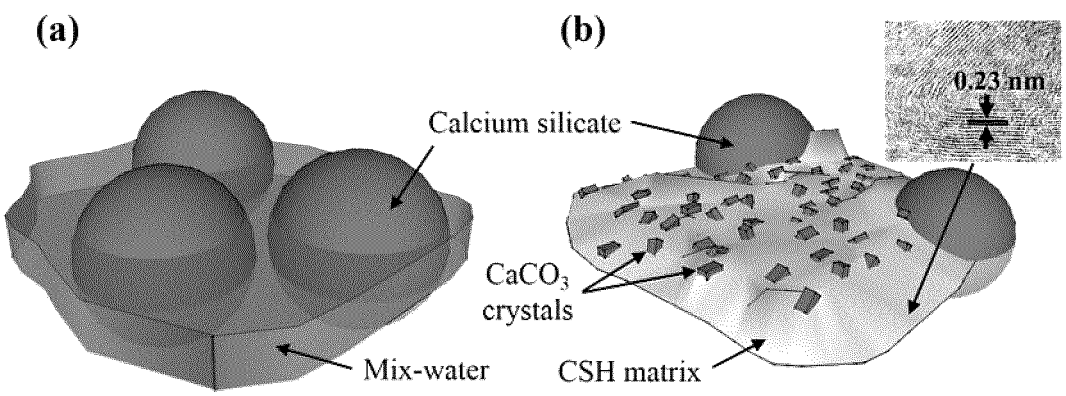
FIG. 24 A microstructural illustration of the cement paste (a) before, and (b) after, carbonation activation.

FIG. 24 presents another schematic illustration of the formation of the composite paste matrix. Initially, water and cement grains only constitute the paste slurry. After carbonation, C—S—H and $CaCO_3$ are generated within the interstitial spaces previously occupied by water, where C—S—H forms the binding matrix, and the randomly oriented carbonate precipitates act as a sort of granular reinforcement to the matrix, very much like aggregates reinforce concrete.

While preferred embodiments have been described above and illustrated in the accompanying drawings, it will be evident to those skilled in the art that modifications may be made without departing from this disclosure. Such modifications are considered as possible variants comprised in the scope of the disclosure.

REFERENCES

1. El-Hassan, H.; Shao, Y.; Ghouleh, Z. 2013. Effect of Initial Curing on Carbonation of Lightweight Concrete Masonry Units. ACI Materials Journal 110(4), 441-450.
2. Young, J. F.; Berger, R. L.; Breese, J. 1974. Accelerated Curing of Compacted Calcium silicate Mortars on Exposure to CO2. Journal of the American Ceramic Society 57(9), 394-397
3. Bukowski, J. M.; Berger, R. L. 1979. Reactivity and Strength Development of CO2 Activated Non-Hydraulic Calcium Silicates. Cement and Concrete Research 9(1), 57-68.
4. Puertas, F.; Garcia-Diaz, I.; Barba, A.; Gazulla, M. F.; Palacios, M.; Gomez, M. P.; Martinez-Ramirez, S. 2008. Ceramic Wastes as Alternative Raw Materials for Portland Cement Clinker Production. Cement and Concrete Composites 30(9), 798-805.

The invention claimed is:

1. A process for producing precast products in an airtight enclosure, which comprises the steps of:
   a) carbonation of pre-dried concrete precast units by feeding $CO_2$ gas into a closed airtight enclosure under a pressure comprising between 0 and 15 psig, wherein said pre-dried concrete units have lost between 25 to 60% of their initial mix water content, and wherein a self-cleaning soaking step ensures that all the $CO_2$ gas introduced into the enclosure during curing is consumed by the units, with minimal to zero residual $CO_2$ present at the end of the curing cycle.

2. The process of claim 1, wherein said precast products are selected from the group consisting of masonry units, pavers, pipes, and hollow-core slabs.

3. The process of claim 1, wherein said airtight enclosure is a closed chamber.

4. The process of claim 1, which comprises step (i) to be performed before step (a):
   i) fan-assisted drying for accelerated water loss of wet newly formed precast concrete units to lose anywhere between 25 and 60% of a unit's initial mix water content.

5. The process of claim 1, wherein the process is a pseudo-dynamic process with regimented $CO_2$ multi-injections.

6. The process of claim 1, wherein carbonation achieves a $CO_2$ uptake equivalent to 15-25% mass of cement in a concrete mix.

7. The process of claim 1, further comprising the step of monitoring and recording at least one process variable pertaining to one chosen from injected gas flow rate, temperature, pressure, and $CO_2$ concentration of interior of the enclosure.

8. The process of claim 1, further comprising, further comprising the step of controlling at least one process variable pertaining to gas flow rate, pressure, and $CO_2$ concentration.

9. The process of claim 1, wherein carbonation curing is carried out at the low pressure conditions in an airtight pressurizable solid-walled enclosure.

10. The process of claim 1, wherein carbonation curing is carried out at the low pressure conditions in an airtight pressurizable solid-walled enclosure, preceded by a purging step to displace a volume of ambient air initially present in the enclosure.

11. The process of claim 1, wherein carbonation curing is carried out substantially at an ambient $CO_2$ pressure in an airtight solid-walled enclosure, preceded by a purging step to displace in volume of ambient air initially present in the enclosure.

12. The process of claim 1, wherein carbonation curing is carried out substantially at an ambient $CO_2$ pressure in an airtight flexible polymer enclosure, preceded by a vacuum step to exhaust 50 to 90% the volume of ambient air initially present in the enclosure.

13. The process of claim 1 wherein by-product-sourced $CO_2$ gas with a purity ranging from 10 to 99% concentration can be used.

14. A precast concrete product prepared by the process claim 1, which has a high early-age compressive and flexural strength, and a high calcium-carbonate-reinforced C—S—H content, and is more resistant to freeze-thaw damage, sulfate attack, carbonation shrinkage, efflorescence, and chemical ion permeation, compared to a standard precast concrete product.

15. The precast concrete product prepared by the process claim 1, with a densified concrete paste matrix reinforced with property-enhancing nano-calcium-carbonate precipitates.

16. The precast concrete product prepared by the process of claim 1, with a cement content of 25 to 50% in said concrete mix.

* * * * *